US008010349B2

(12) United States Patent
Oshikiri

(10) Patent No.: US 8,010,349 B2
(45) Date of Patent: Aug. 30, 2011

(54) SCALABLE ENCODER, SCALABLE DECODER, AND SCALABLE ENCODING METHOD

(75) Inventor: Masahiro Oshikiri, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1145 days.

(21) Appl. No.: 11/576,659

(22) PCT Filed: Oct. 11, 2005

(86) PCT No.: PCT/JP2005/018693

§ 371 (c)(1), (2), (4) Date: Apr. 4, 2007

(87) PCT Pub. No.: WO2006/041055

PCT Pub. Date: Apr. 20, 2006

(65) Prior Publication Data

US 2007/0253481 A1 Nov. 1, 2007

(30) Foreign Application Priority Data

Oct. 13, 2004 (JP) ................................ 2004-298942

(51) Int. Cl.
*G10L 11/00* (2006.01)
*G10L 19/00* (2006.01)
*G10L 21/00* (2006.01)
*G10L 21/02* (2006.01)
*G06F 15/00* (2006.01)

(52) U.S. Cl. ..................... 704/206; 704/200; 704/200.1; 704/201; 704/219; 704/227

(58) Field of Classification Search .................. 704/200, 704/200.1, 201, 206, 219, 227
See application file for complete search history.

(56) References Cited

U.S. PATENT DOCUMENTS 4,716,592 A * 12/1987 Ozawa et al. ................. 704/216
5,317,672 A * 5/1994 Crossman et al. ............ 704/229
5,388,181 A * 2/1995 Anderson et al. .......... 704/200.1
5,408,266 A * 4/1995 Ikeyama et al. ............ 348/222.1
5,684,920 A * 11/1997 Iwakami et al. .............. 704/203
5,764,698 A * 6/1998 Sudharsanan et al. ........ 375/241
5,905,970 A * 5/1999 Aoyagi ......................... 704/220
(Continued)

FOREIGN PATENT DOCUMENTS

CN 1369092 9/2002
(Continued)

OTHER PUBLICATIONS

European Search Report dated Dec. 17, 2009 that issued with respect to patent family member European Patent Application No. 05793144.6.

(Continued)

*Primary Examiner* — Eric Yen
(74) *Attorney, Agent, or Firm* — Greenblum & Bernstein, P.L.C.

(57) ABSTRACT

A scalable encoder enabling improvement of the encoding efficiency in the second layer and improvement of the quality of the original signal decoded using the encoding signal in the second layer. A predictive coefficient encoder of the scalable encoder has a predictive coefficient codebook where candidates of the predictive coefficient are recorded. After searching the predictive coefficient codebook, the scale factor of the first layer decoded signal inputted from a scale factor calculator is multiplied, and a predictive coefficient which most approximates the multiplication result to the scale factor of the original signal inputted from the scale factor calculator is determined and encoded, and the coded code is inputted to a multiplexer.

13 Claims, 19 Drawing Sheets

U.S. PATENT DOCUMENTS

| | | | | | |
|---|---|---|---|---|---|
| 5,911,128 | A | * | 6/1999 | DeJaco | 704/200.1 |
| 5,978,759 | A | | 11/1999 | Tsushima et al. | |
| 6,064,954 | A | * | 5/2000 | Cohen et al. | 704/207 |
| 6,167,375 | A | * | 12/2000 | Miseki et al. | 704/229 |
| 6,208,957 | B1 | | 3/2001 | Nomura | |
| 6,226,616 | B1 | * | 5/2001 | You et al. | 704/500 |
| 6,275,796 | B1 | * | 8/2001 | Kim et al. | 704/230 |
| 6,345,246 | B1 | * | 2/2002 | Moriya et al. | 704/219 |
| 6,446,037 | B1 | | 9/2002 | Fielder et al. | |
| 6,675,140 | B1 | * | 1/2004 | Irino et al. | 704/203 |
| 6,792,542 | B1 | * | 9/2004 | Lee et al. | 726/1 |
| 7,617,097 | B2 | * | 11/2009 | Kim et al. | 704/219 |
| 7,720,676 | B2 | | 5/2010 | Philippe et al. | |
| 2004/0105544 | A1 | | 6/2004 | Haneda et al. | |
| 2004/0162911 | A1 | | 8/2004 | Sperschneider et al. | |
| 2005/0004803 | A1 | | 1/2005 | Smeets et al. | |
| 2005/0163323 | A1 | | 7/2005 | Oshikiri | |
| 2006/0265087 | A1 | | 11/2006 | Philippe et al. | |

FOREIGN PATENT DOCUMENTS

| | | |
|---|---|---|
| EP | 1489599 | 12/2004 |
| JP | 11-30997 | 2/1999 |
| JP | 2002-42416 | 2/2002 |
| JP | 2004-93772 | 3/2004 |
| JP | 2004-102186 | 4/2004 |
| JP | 2004-523790 | 8/2004 |
| JP | 2006-520487 | 9/2006 |
| WO | 03044777 | 5/2003 |
| WO | 03/091989 | 11/2003 |
| WO | 03091989 | 11/2003 |
| WO | 2004/081918 | 9/2004 |

OTHER PUBLICATIONS

"Everything about MPEG-4," edited by S. MIKI, First Edition, Japan Industrial Standards Committee, Sep. 30, 1998, pp. 126-127 (in Japanese), together with an English language translation of the same.

U.S. Appl. No. 11/576,264 to Goto et al., which was filed Mar. 29, 2007.

U.S. Appl. No. 11/577,424 to Oshikiri, which was filed Apr. 18, 2007.

U.S. Appl. No. 11/577,638 to Oshikiri, which was filed Apr. 20, 2007.

U.S. Appl. No. 11/577,816 to Oshikiri, which was filed Apr. 24, 2007.

* cited by examiner

| | AUDIO | CLEAN SPEECH | IN-CAR NOISE | CROWD NOISE |
|---|---|---|---|---|
| WITHOUT SMOOTHING | 27.3 dB | 30.3 dB | 24.4 dB | 29.7 dB |
| WITH SMOOTHING | 30.0 dB | 29.7 dB | 29.2 dB | 29.7 dB |

FIG. 17

SCALABLE ENCODER, SCALABLE DECODER, AND SCALABLE ENCODING METHOD

TECHNICAL FIELD

The present invention relates to a scalable coding apparatus that hierarchically encodes a speech signal or the like.

BACKGROUND ART

In conventional mobile communication systems, speech signals are required to be compressed at a low bit rate in order to effectively utilize radio resources. Also, implementation of enhanced telephone speech quality and a communication service with high-fidelity are also desired. In order to achieve this, not only the speech signal but also other signal components other than the speech component, including, for example, wider-bandwidth audio signals also need to be encoded at high quality.

An approach for hierarchically integrating multiple encoding techniques is being viewed as a possible means of satisfying such contradictory requirements. Specifically, an approach is being studied that combines a first layer coding section that encodes a speech component at a low bit rate according to a model that is specialized for speech signals, and a second layer coding section that encodes a signal component other than the speech component according to a more versatile model. The encoded bit stream is scalable (a decoded signal can be obtained even from part of the bit stream information), so that this type of layered encoding scheme is referred to as a "scalable encoding scheme."

A scalable encoding scheme is naturally able to flexibly adapt to communication between networks that have different bit rates. This characteristic is suitable for future network environments as various networks continue to be integrated by IP protocol.

A means is known that uses the technique standardized by MPEG-4 (Moving Picture Experts Group phase-4) as an implementing means of scalable encoding (see non-patent document 1, for example). In the technique described in non-patent document 1, a CELP (Code Excited Linear Prediction) scheme, which is a typical encoding scheme that is specialized for speech signals, is applied in a first layer, and an AAC (Advanced Audio Coder) scheme or TwinVQ (Transform Domain Weighted Interleave Vector Quantization) scheme as a more versatile encoding model is applied in a second layer for the residual signal obtained by subtracting the first layer decoded signal from the original signal. Although the two schemes applied in the second layer differ from each other, a basic aspect common to both schemes is that during quantization of MDCT (Modified Discrete Cosine Transform) coefficients, the MDCT coefficients are divided into spectral outline information that indicates the general shape of the spectrum, and spectral detail information that indicates the residual detailed spectral shape, and that the spectral outline information and spectral detail information are each encoded.

Non-Patent Document 1: S. Miki ed., "Everything About MPEG-4," First Edition, Japan Industrial Standards Committee, 30 Sep. 1998, pp. 126-127.

DISCLOSURE OF INVENTION

Problems to be Solved by the Invention

However, in the technique described in non-patent document 1, encoding is performed in the second layer on the residual signal obtained by subtracting the first layer decoded signal from the input signal (i.e. the original signal). The main information included in the original signal is removed by passing through the first layer section, and so the characteristics of this type of residual signal approximate those of a noise sequence. The technique described in non-patent document 1 therefore has problems in that the encoding efficiency in the second layer decreases, and the quality of the original signal is difficult to enhance even when the signal encoded in the second layer is used to decode the original signal.

An object of the present invention is to provide, for example, a scalable coding apparatus for improving the encoding efficiency of the second layer and enhancing the quality of an original signal that is decoded using the signal encoded in the second layer.

Means for Solving the Problem

The scalable coding apparatus according to the present invention employs a configuration having: a lower layer coding section that encodes an input signal and generates lower layer encoded parameters; a lower layer decoding section that decodes the lower layer encoded parameters and generates a lower layer decoded signal; a first spectral outline calculating section that calculates a spectral outline of the input signal based on the input signal; a second spectral outline calculating section that calculates a spectral outline of the lower layer decoded signal based on the lower layer decoded signal; a predictive information coding section that obtains predictive information by predicting the spectral outline of the input signal from the spectral outline of the lower layer decoded signal, encodes the predictive information, and generates upper layer encoded parameters; and an output section that outputs the lower layer encoded parameters and the upper layer encoded parameters.

The scalable decoding apparatus according to the present invention is a scalable decoding apparatus for decoding encoded parameters generated by a scalable coding apparatus performing scalable encoding on an input signal and employs a configuration having: a lower layer decoding section that decodes the encoded parameters and generates a lower layer decoded signal; a predictive information decoding section that generates predictive information for predicting a spectral outline of the input signal by decoding the encoded parameters; and a spectrum generating section that generates the spectral outline of the input signal based on the lower layer decoded signal and the predictive information.

Advantageous Effect of the Invention

According to the present invention, the predictive information coding section generates and encodes predictive information that makes the spectral outline of the input signal predicted from the spectral outline of the lower layer decoded signal, and outputs the encoded predictive information as upper layer encoded parameters. Therefore, the encoding efficiency of the upper layer encoded parameters can be improved, and the quality of the input signal that is decoded using the upper layer encoded parameters can be increased.

BRIEF DESCRIPTION OF DRAWINGS

FIG. 17 is a diagram showing an example of the results of calculating the quantization performance of the scale factors in Embodiment 2 using a computer simulation.

BEST MODE FOR CARRYING OUT THE INVENTION

The present invention uses, in the second layer coding section of scalable encoding, a strong correlation between the spectral outline of the first layer decoded signal and the spectral outline obtained by roughly estimating the spectral shape of an original signal (i.e. the input signal) at each predetermined frequency band, predicts the spectral outline of the original signal using the spectral outline of the first layer decoded signal, and the predictive information is encoded, whereby the bit rate of a second layer encoded parameters of the input signal is reduced.

Embodiments of the present invention will be described in detail hereinafter with reference to the drawings. The input signal is subjected to scalable encoding in the embodiments under the preconditions described below.

(1) There are two layers that include a first layer (lower layer) and a second layer (upper layer).

(2) In the encoding of the second layer, encoding is performed in the frequency domain (transform coding).

(3) MDCT is used as the conversion scheme in the second-layer encoding.

(4) In the second-layer encoding, the input signal band is divided into a plurality of subbands (frequency bands) and encoding is performed in each subband unit.

(5) In the second-layer encoding, the MDCT coefficients included in each subband are divided into information that indicates the spectral outline, and spectral detail information that indicates the detailed shape of the MDCT coefficients in the subband that cannot be shown in the spectral outline, and are encoded.

(6) In the second-layer encoding, the average amplitude of each subband is used as the information indicating the spectral outline. This average amplitude of a subband is referred to as a "scale factor."

(7) In the second-layer encoding, subband division is performed in correlation with the critical band, and subbands are divided by equal intervals in a Bark scale.

Embodiment 1

Figure 1:
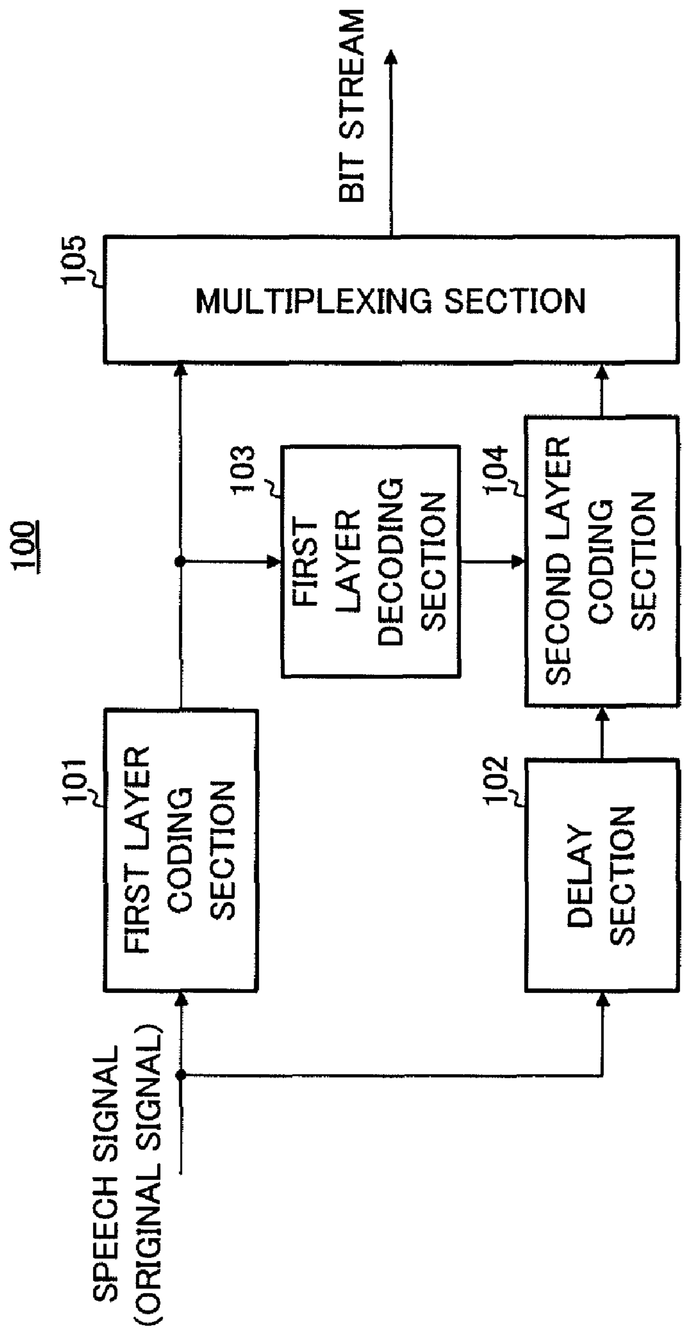
FIG. 1 is a block diagram showing the primary configuration of the scalable coding apparatus according to Embodiment 1.

FIG. 1 is a block diagram showing the primary configuration of scalable coding apparatus 100 according to Embodiment 1 of the present invention. Scalable coding apparatus 100 is provided with first layer coding section 101, delay section 102, first layer decoding section 103, second layer coding section 104, and multiplexing section 105.

First layer coding section 101 encodes an original signal of a speech signal inputted from a microphone or the like (not shown), generates first layer encoded parameters, and inputs the generated first layer encoded parameters to first layer decoding section 103 and multiplexing section 105.

Delay section 102 applies a delay of predetermined length to the inputted original signal to correct the time delay that occurs between first layer coding section 101 and first layer decoding section 103, and inputs the delayed original signal to second layer coding section 104.

First layer decoding section 103 decodes the first layer encoded parameters inputted from first layer coding section 101, generates a first layer decoded signal, and inputs the generated first layer decoded signal to second layer coding section 104.

Second layer coding section 104 determines and encodes predictive coefficients that are necessary for predicting a spectral outline of the original signal from the spectral outline of the first layer decoded signal, based on the first layer decoded signal inputted from first layer decoding section 103 and the original signal delayed for the predetermined time, which is inputted from delay section 102, generates and encodes spectral detail information that is necessary for showing the spectral shape not indicated by the spectral outlines, and inputs the encoded parameters to multiplexing section 105. The specific manner in which these encoded parameters in second layer coding section 104 are generated will be described hereinafter.

Multiplexing section 105 multiplexes the first layer encoded parameters inputted from first layer coding section 101 with the encoded parameters inputted from second layer coding section 104, and outputs the bit stream as a bit stream outside scalable coding apparatus 100. Accordingly, multiplexing section 105 functions as the output means in the present invention.

Figure 2:
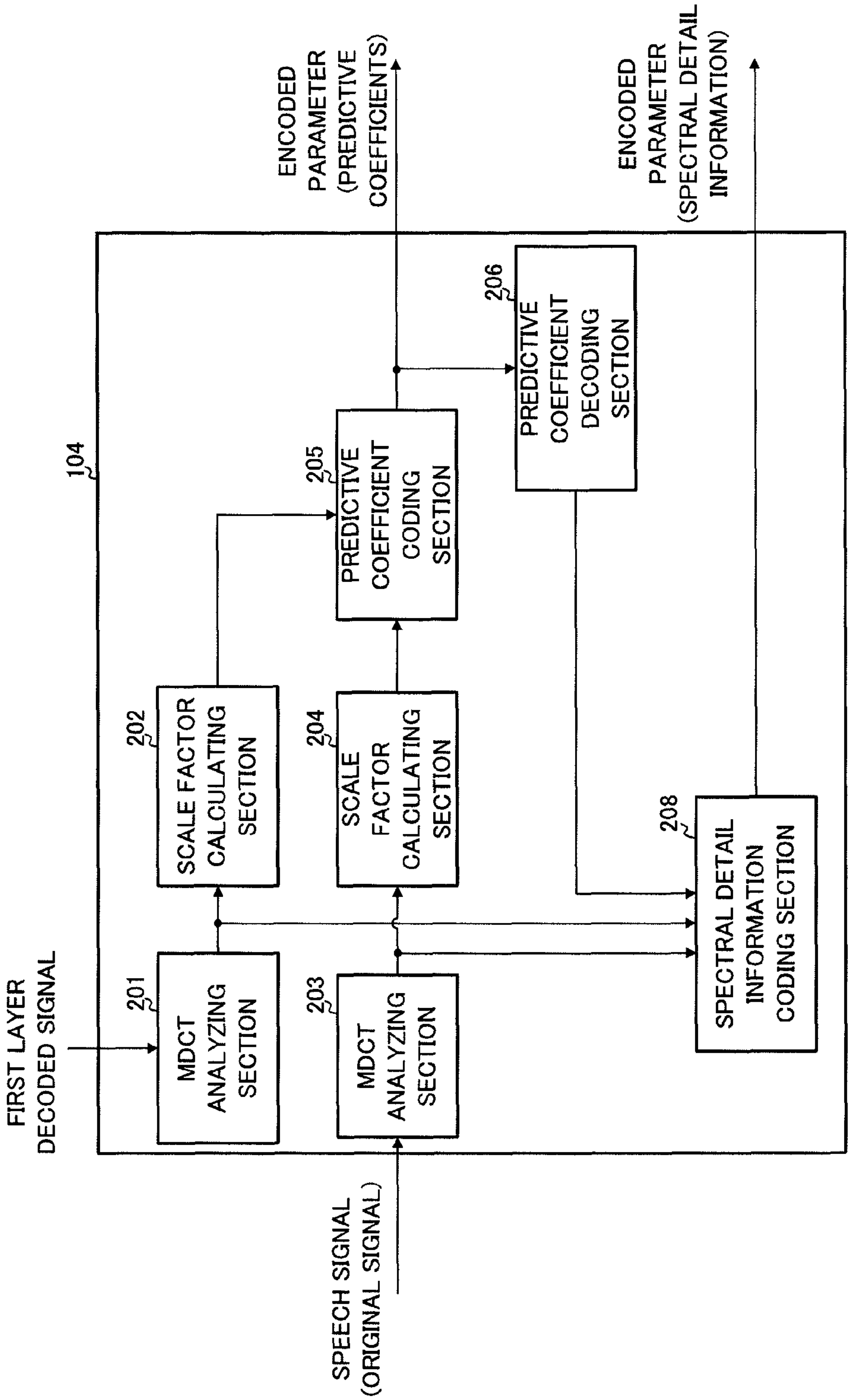
FIG. 2 is a block diagram showing the primary configuration of the second layer coding section in Embodiment 1.

FIG. 2 is a block diagram showing the primary configuration of second layer coding section 104 in scalable coding apparatus 100. Second layer coding section 104 is provided with MDCT analyzing sections 201 and 203; scale factor calculating sections 202 and 204; predictive coefficient coding section 205; predictive coefficient decoding section 206; and spectral detail information coding section 208.

MDCT analyzing section 201 calculates MDCT coefficients of the first layer decoded signal inputted from first layer decoding section 103, and inputs the calculated MDCT coefficients of the first layer decoded signal to scale factor calculating section 202 and spectral detail information coding section 208.

Scale factor calculating section 202 calculates scale factors for the subbands in the first layer decoded signal based on the MDCT coefficients of the first layer decoded signal, which is inputted from MDCT analyzing section 201. Scale factor calculating section 202 then inputs the calculated scale factors of the first layer decoded signal to predictive coefficient coding section 205. This scale factors indicate the average amplitude of the MDCT coefficients included in the subbands, and are important parameters that influence the sound quality of the decoded signal. With the present embodiment, the term "spectral outline" refers to the shape obtained when the scale factors of the subbands are linked in the frequency direction.

MDCT analyzing section 203 calculates the MDCT coefficients of the original signal inputted from delay section 102, and inputs the calculated MDCT coefficients of the original signal to scale factor calculating section 204 and spectral detail information coding section 208.

Scale factor calculating section 204 calculates the scale factors of the subbands of the original signal based on the MDCT coefficients of the original signal inputted from MDCT analyzing section 203, and inputs the calculated scale factors of the original signal to predictive coefficient coding section 205.

Predictive coefficient coding section 205 is provided with a predictive coefficient codebook in which candidates of the predictive coefficients are recorded, searches the predictive coefficient codebook to determine a predictive coefficients that, upon being multiplied by the scale factors of the first layer decoded signal inputted from scale factor calculating section 204, approximates the multiplication result closest to the scale factors of the original signal inputted from scale factor calculating section 204, encodes the determined predictive coefficients, and inputs the encoded parameters of the determined predictive coefficients to multiplexing section 105 and predictive coefficient decoding section 206. The specific manner in which the predictive coefficients in predictive coefficient coding section 205 are determined will be described hereinafter.

Predictive coefficient decoding section 206 decodes the predictive coefficients using the encoded parameters inputted from predictive coefficient coding section 205, and inputs the decoded predictive coefficients to spectral detail information coding section 208.

Spectral detail information coding section 208 generates and encodes spectral detail information that indicates the detailed shapes of the MDCT coefficients in a subband using the MDCT coefficients of the first layer decoded signal inputted from MDCT analyzing section 201, the MDCT coefficients of the original signal inputted from MDCT analyzing section 203, and the decoded predictive coefficients inputted from predictive coefficient decoding section 206, and inputs the encoded parameters to multiplexing section 105. By multiplying the MDCT coefficients of the first layer decoded signal inputted from MDCT analyzing section 201 by the decoded predictive coefficients inputted from predictive coefficient decoding section 206, substantially the same spectral shape as the spectral outline of the original signal is generated, so that spectral detail information coding section 208 is able to generate the spectral detail information by comparing this generated spectral shape with the MDCT coefficients of the original signal inputted from MDCT analyzing section 203.

Figure 3:
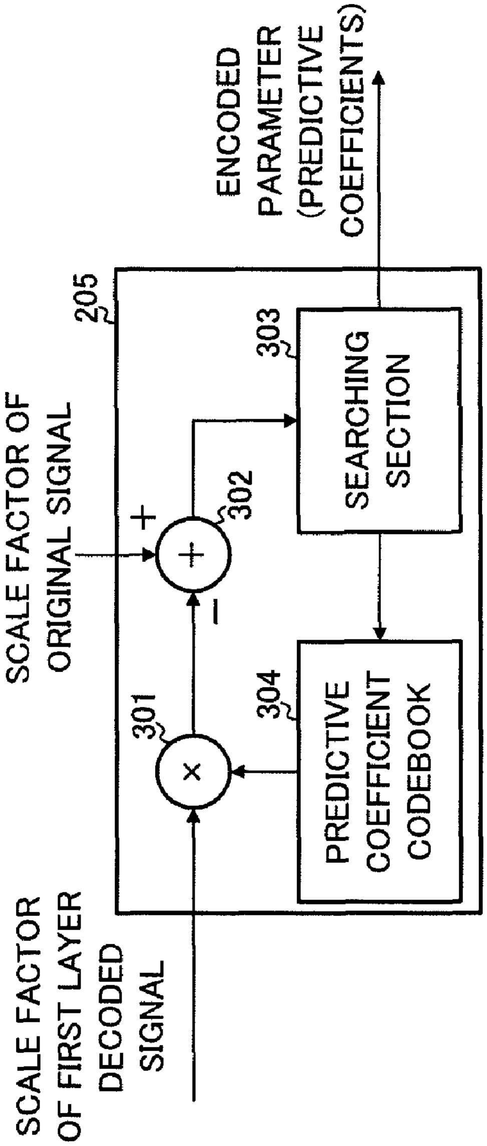
FIG. 3 is a block diagram showing the primary configuration of the predictive coefficient coding section in Embodiment 1.

FIG. 3 is a block diagram showing the primary configuration of predictive coefficient coding section 205 in scalable coding apparatus 100 according to the present embodiment. Predictive coefficient coding section 205 is provided with multiplier 301, adder 302, searching section 303, and predictive coefficient codebook 304.

Multiplier 301 multiplies the scale factors of the first layer decoded signal inputted from scale factor calculating section 202 by the predictive coefficients inputted from predictive coefficient codebook 304, and then inputs the multiplication result to adder 302.

Adder 302 subtracts the scale factors of the first layer decoded signal (multiplied by the predictive coefficients) inputted from multiplier 301 from the scale factors of the original signal inputted from scale factor calculating section 204, thereby generating an error signal, and inputs the generated error signal to searching section 303.

Searching section 303 instructs predictive coefficient codebook 304 to input all the predictive coefficient candidates retained to multiplier 301 in sequence. Searching section 303 monitors the error signal inputted from adder 302, determines the predictive coefficients that minimizes the error, encodes the determined predictive coefficients, and inputs the encoded parameters to multiplexing section 105.

Predictive coefficient codebook 304 retains candidates for the predictive coefficients, and inputs predictive coefficients in sequence to multiplier 301 according to the instruction from searching section 303.

Here, the estimated value X'(m) of the scale factors of the original signal is calculated using the following Equation 1, wherein X'(m) represents the estimated value of the scale factors of the original signal, i.e., the value obtained when the scale factors of the first layer decoded signal is multiplied by the predictive coefficient, Y(m) represents the scale factor of the first layer decoded signal, α(m) represents the predictive coefficient, and m represents the subband number.

$$(X'(m)=\alpha(m)\times Y(m) \quad \text{(Equation 1)}$$

By means of the estimated value X'(m) of the scale factor of the original signal calculated by Equation 1, searching section 303 determines the predictive α(m) that minimizes the error E indicated by Equation 2 below, encodes the determined predictive coefficients, and outputs the encoded parameters to multiplexing section 105. The scale factor of the original signal is indicated as X(m) in Equation 2.

$$(E=(X(m)-X'(m))^2 \quad \text{(Equation 2)}$$

Figure 4:
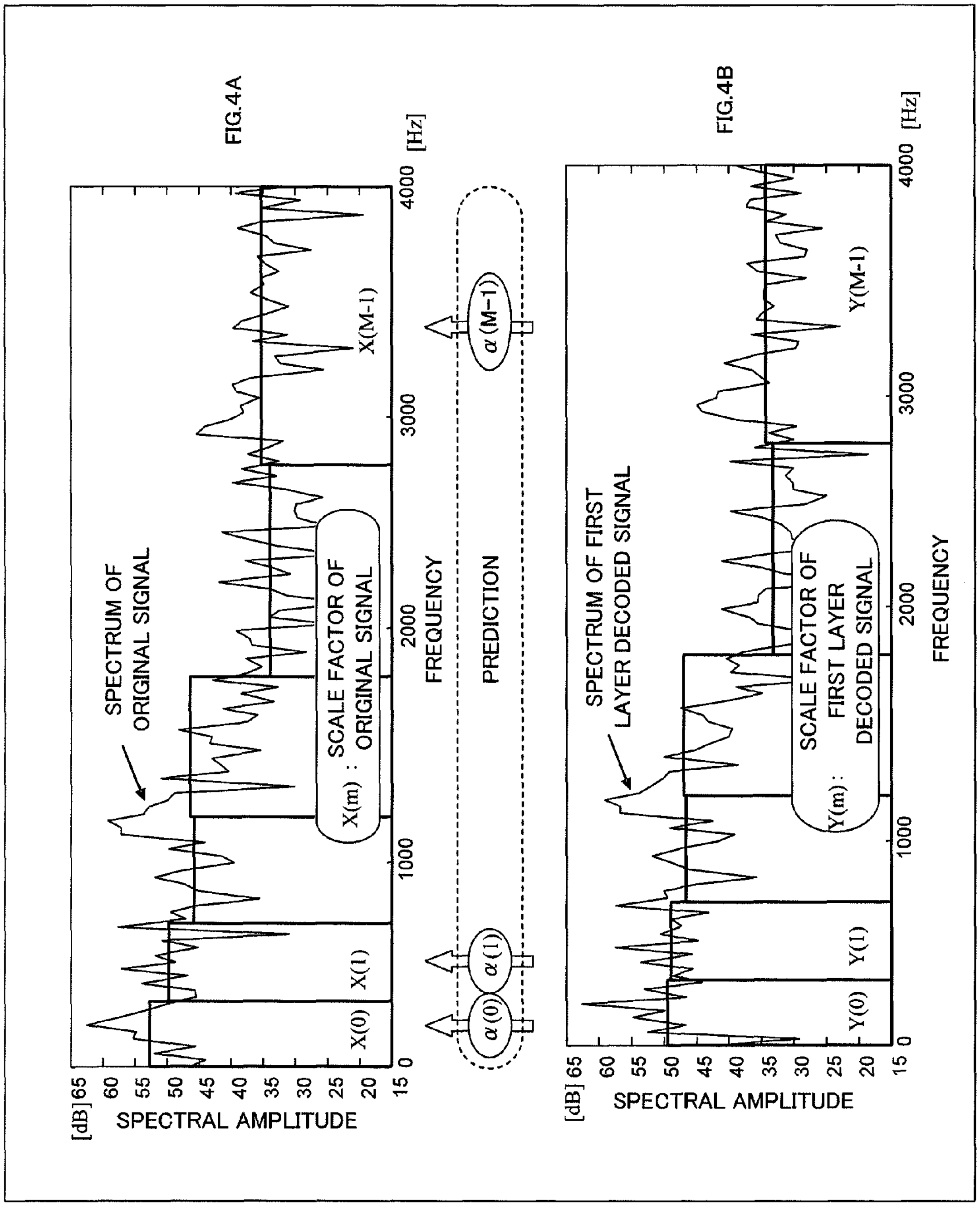
FIG. 4 is a diagram showing the relationship between spectra and spectral outlines in Embodiment 1.

FIG. 4 shows an example of the relationship between the original signal spectrum and the scale factor of the original signal (a), and the first layer decoded signal spectrum and first layer decoded signal scale factor (b). As is apparent from FIG. 4, although the spectrum of the original signal and the spectrum of the first layer decoded signal differ from each other in minute parts, the scale factors thereof have substantially the same shape, and, therefore, the scale factors are considered to have a strong correlation. In other words, the encoding efficiency is further improved by focusing on the spectral outline information typified by the scale factors and carrying out prediction than by focusing on the spectral detail information and carrying out prediction. It is thus understood that the scale factors of the original signal can be generated accurately when the scale factors of the first layer decoded signal and the predictive coefficients are used. The spectrum of the original signal and the spectrum of the first layer decoded signal shown in FIG. 4 are plotted by calculating the spectral amplitude of the MDCT coefficients.

Figure 5:
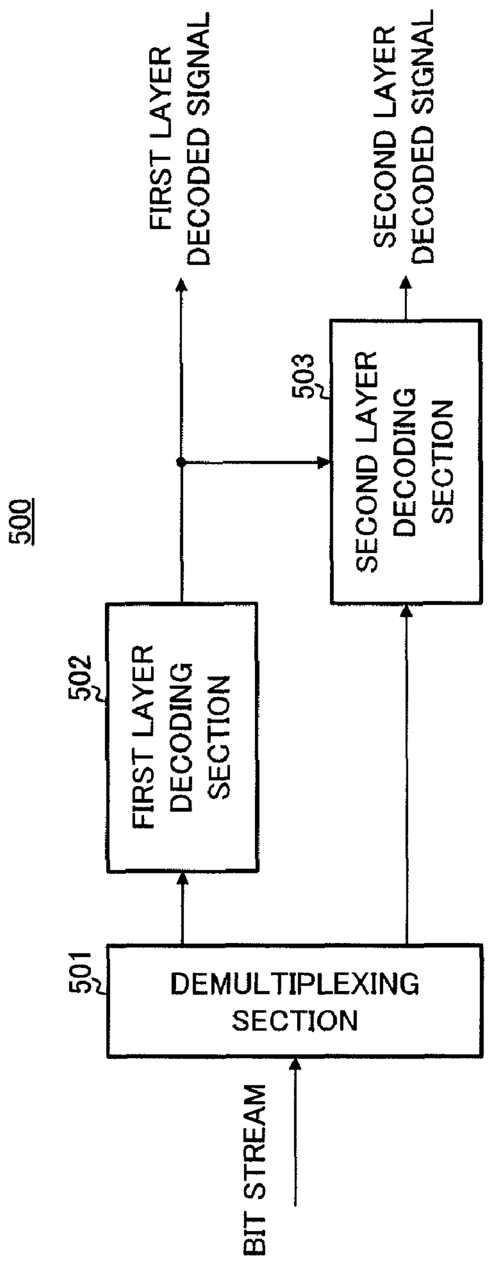
FIG. 5 is a block diagram showing the primary configuration of the scalable decoding apparatus according to Embodiment 1.

FIG. 5 is a block diagram showing the primary configuration of scalable decoding apparatus 500 according to the present embodiment. Scalable decoding apparatus 500 is provided with demultiplexing section 501, first layer decoding section 502, and second layer decoding section 503.

Demultiplexing section 501 separates the bit stream transmitted from scalable coding apparatus 100, inputs the first layer encoded parameters to first layer decoding section 502, and also inputs the encoded parameters of the predictive coefficients and the encoded parameters of the spectral detail information to second layer decoding section 503.

First layer decoding section 502 generates a first layer decoded signal from the first layer encoded parameters inputted from demultiplexing section 501, and inputs the first layer decoded signal to second layer decoding section 503. The first layer decoded signal is outputted directly outside scalable decoding apparatus 500. By this means, it is possible to use this output when it is necessary to output the first layer decoded signal that is generated by first layer decoding section 502.

Second layer decoding section 503 performs decoding processing (described later) for the encoded parameters inputted from demultiplexing section 501 and the first layer decoded signal inputted from first layer decoding section 502, and generates and outputs a second layer decoded signal. A minimum quality of reproduced speech is ensured by the first layer decoded signal, and the quality of the reproduced speech can be enhanced by the second layer decoded signal. Application settings and the like determine whether or not to use the second layer decoded signal.

Figure 6:
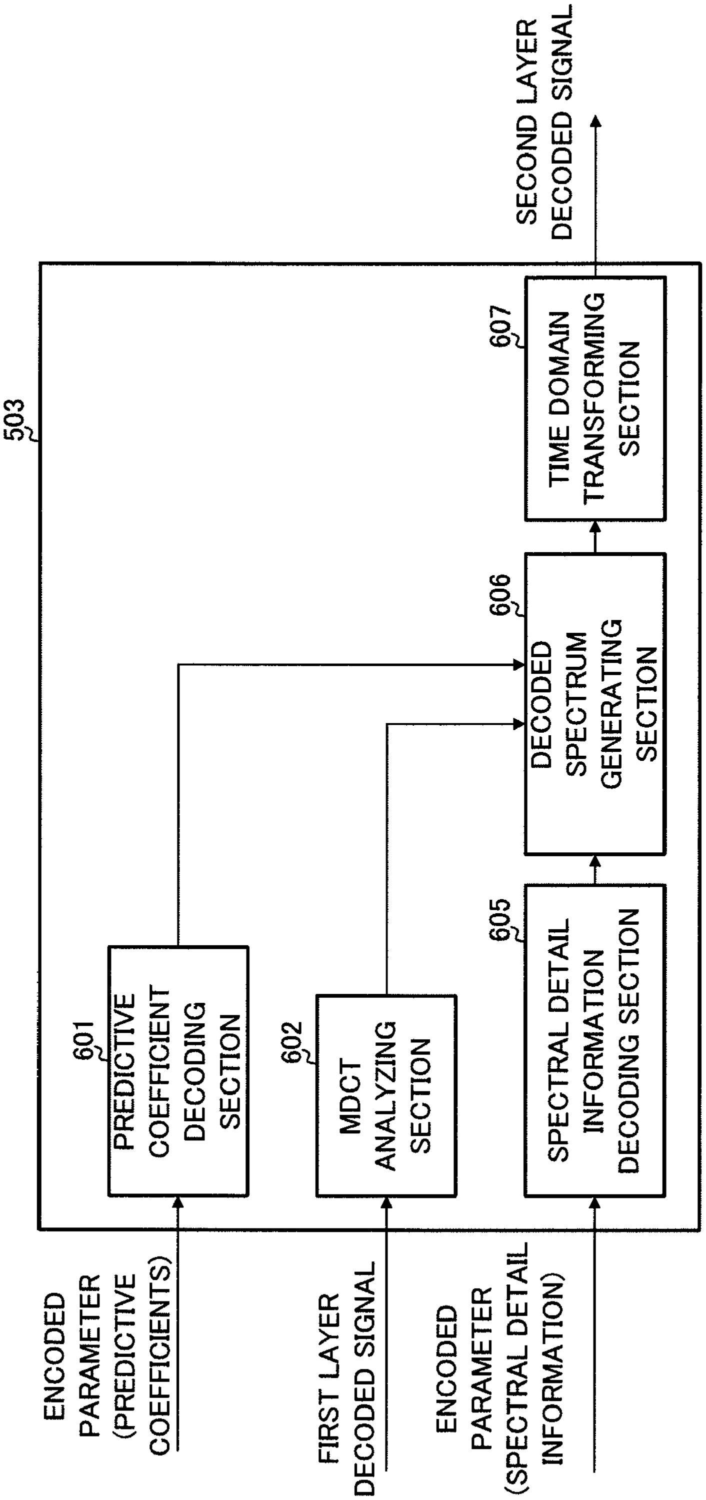
FIG. 6 is a block diagram showing the primary configuration of the second layer coding section in Embodiment 1.

FIG. 6 is a block diagram showing the primary configuration of second layer decoding section 503 in scalable decoding apparatus 500 according to the present embodiment. Second layer decoding section 503 is provided with predictive coefficient decoding section 601, MDCT analyzing section 602, spectral detail information decoding section 605, decoded spectrum generating section 606, and time domain transforming section 607.

Predictive coefficient decoding section 601 decodes the encoded parameters inputted from demultiplexing section 501 into predictive coefficients, and inputs the decoded predictive coefficients to decoded spectrum generating section 606.

MDCT analyzing section 602 performs frequency transformation of the first layer decoded signal, which is the time domain signal inputted from first layer decoding section 502, by modified discrete cosine transform (MDCT) to calculate MDCT coefficients, and inputs the calculated MDCT coefficients of the first layer decoded signal to decoded spectrum generating section 606.

Spectral detail information decoding section 605 decodes the encoded parameters inputted from demultiplexing section 501, generates spectrum detail information, and inputs the generated spectrum detail information to decoded spectrum generating section 606.

Decoded spectrum generating section 606 generates the decoded spectrum of the original signal from the decoded predictive coefficient inputted from predictive coefficient decoding section 601, the spectral detail information inputted from spectral detail information decoding section 605, and the MDCT coefficients of the first layer decoded signal that is inputted from MDCT analyzing section 602, and inputs the generated decoded spectrum of the original signal to time domain transforming section 607. For example, decoded spectrum generating section 606 calculates the decoded spectrum U(k) of the original signal using the following Equation 3.

[1]

$$U(k)=C(k)+\alpha'(m)\cdot B(k) \quad \text{(Equation 3)}$$

In Equation 3, C(k) is the spectral detail information, α'(m) is the decoded predictive coefficient of the m-th subband, B(k) is the MDCT coefficient of the first layer decoded signal, and k is a frequency included in the m-th subband.

Time domain transforming section 607 transforms the decoded spectrum inputted from decoded spectrum generating section 606 into a time domain signal, and performs windowing or overlapped addition, if necessary, on the transformed signal to eliminate discontinuity that occurs between frames, thereby generating and outputting the second layer decoded signal finally.

There is thus a strong correlation between the scale factors of the original signal and the scale factor of the first layer decoded signal, and the scale factors of the original signal can be generated accurately by multiplying the scale factors of the first layer decoded signal by the predictive coefficients. Furthermore, the amount of data in the encoded parameters of these predictive coefficients are significantly smaller than the amount of data in the encoded parameters of the error signal generated by subtracting the first layer decoded signal from the original signal in the conventional technique.

Therefore, with the present embodiment, scalable coding apparatus 100 transmits the first layer encoded parameters together with the encoded parameters of the predictive coefficients, which is derived from this first layer encoded parameters, to scalable decoding apparatus 500.

Accordingly, according to the present embodiment, it is possible to reduce the bit rate required to transmit the speech signal when scalable coding apparatus 100 performs scalable encoding on a speech signal and transmits the signal to scalable decoding apparatus 500. In other words, according to the present embodiment, it is possible to increase the encoding efficiency of the second layer in the scalable encoding of a speech signal. Furthermore, according to the present embodiment, it is possible to increase the quality of the reproduced speech by scalable decoding apparatus 500.

Scalable coding apparatus 100 or scalable decoding apparatus 500 according to the present embodiment may be modified and applied as described below.

Although with the present embodiment, an example has been described where predictive coefficient coding section 205 outputs the encoded parameters of the predictive coefficient α(m) that minimizes the error E indicated by Equation 2 to multiplexing section 105, the present invention is not limited to this example. For example, a configuration may be adopted where predictive coefficient coding section 205 calculates an ideal coefficient αopt(m) using scale factor X(m) of the original signal and scale factor Y(m) of the first layer decoded signal, and quantizes this ideal coefficient αopt(m). Ideal coefficient αopt(m) herein is indicated by the following Equation 4.

$$\alpha opt(m)=X(m)/Y(m) \quad \text{(Equation 4)}$$

Figure 7:
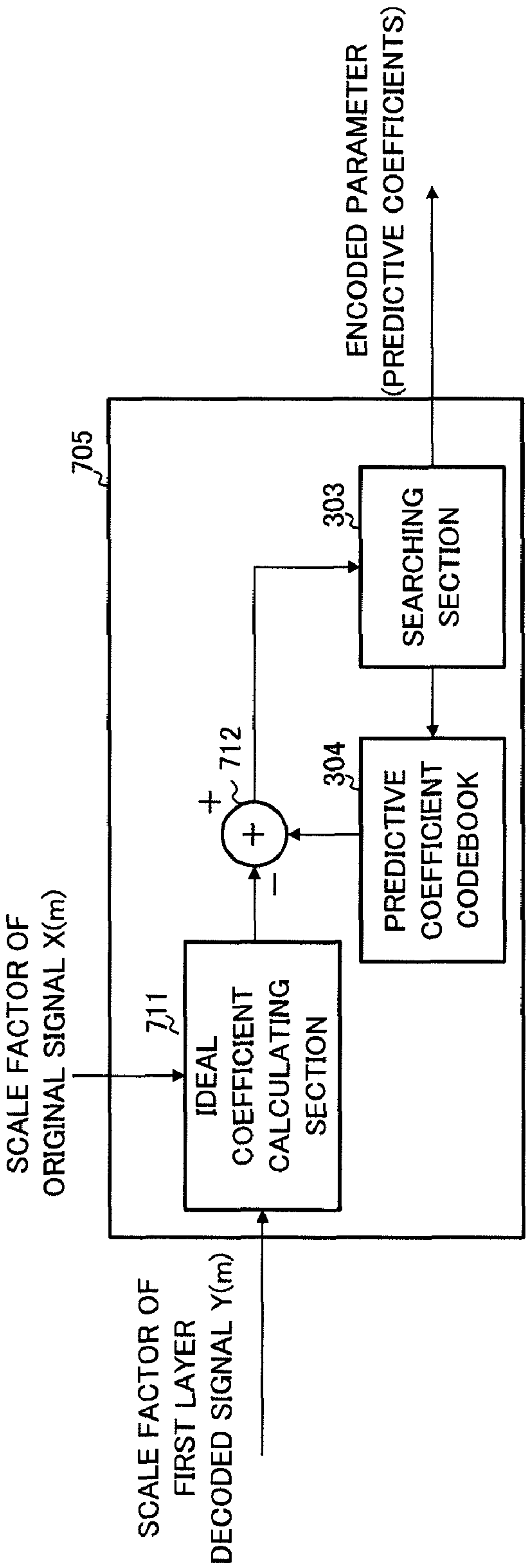
FIG. 7 is a block diagram showing an application example of the predictive coefficient coding section in Embodiment 1.

FIG. 7 is a block diagram showing the primary configuration of predictive coefficient coding section 705 used instead of predictive coefficient coding section 205 in the present application example. Predictive coefficient coding section 705 is provided with searching section 303, predictive coefficient codebook 304, ideal coefficient calculating section 711, and adder 712. Ideal coefficient calculating section 711 calculates ideal coefficient αopt(m) according to Equation 4 from scale factor Y(m) of the first layer decoded signal inputted from scale factor calculating section 202, and scale factor X(m) of the original signal inputted from MDCT analyzing section 203. Adder 712 generates an error signal that indicates the difference between ideal coefficient αopt(m) inputted from ideal coefficient calculating section 711 and the predictive coefficients inputted from predictive coefficient codebook 304, and inputs this error signal to searching section 303. Predictive coefficient coding section 705 inputs the predictive coefficients that minimize the difference indicated by the error signal generated by adder 712, to multiplexing section 105. Searching section 303 and predictive coefficient codebook 304 are components that perform the same operations as the corresponding components in predictive coefficient coding section 205, and therefore, their descriptions will be omitted.

Figure 8:
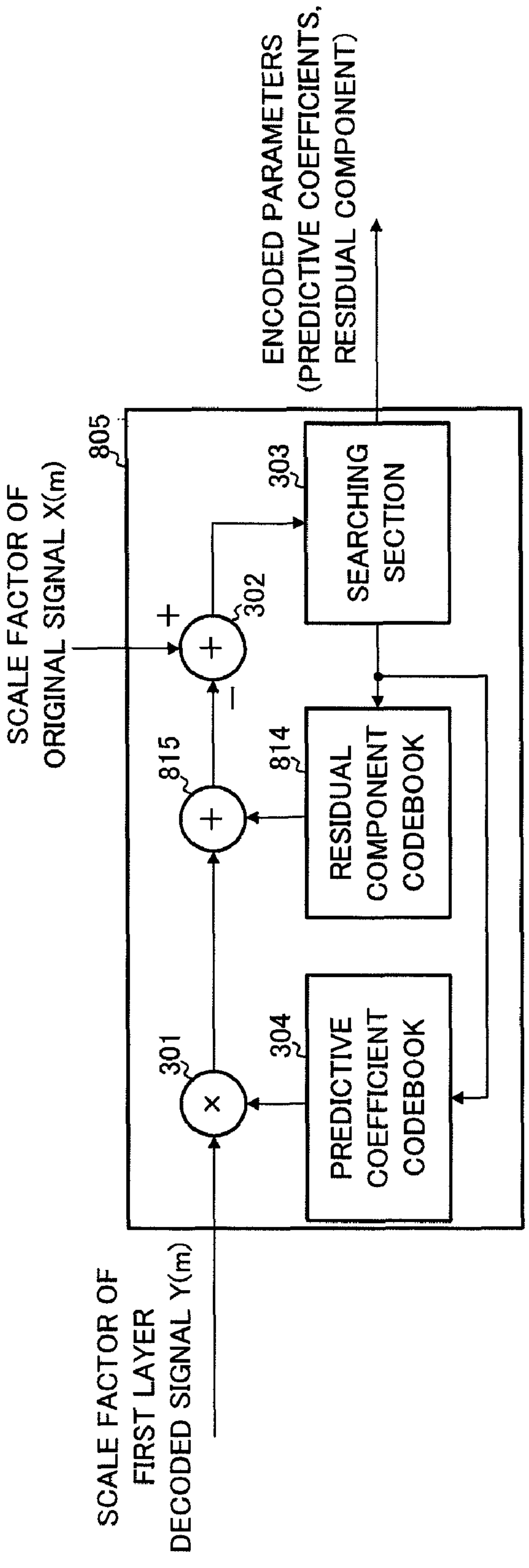
FIG. 8 is a block diagram showing an application example of the predictive coefficient coding section in Embodiment 1.

FIG. 8 shows a different application example from the application example of the present embodiment shown in FIG. 7. FIG. 8 is a block diagram showing the primary configuration of predictive coefficient coding section 805 used instead of predictive coefficient coding section 205. Predictive coefficient coding section 805 is provided with multiplier 301, adders 302 and 815, searching section 303, predictive coefficient codebook 304, and residual component codebook 814. Residual component codebook 814 retains a codebook indicating residual components, and inputs the retained residual components in sequence to adder 815 according to an instruction from searching section 303. Adder 815 adds the difference component inputted from residual component codebook 814 to the scale factors of the first layer decoded signal that is multiplied by the predictive coefficients and inputted from multiplier 301, and inputs the addition result to adder 302. Predictive coefficient coding section 805 then determines the combination of the predictive coefficients and the residual component that minimizes the difference indicated by the error signal generated in adder 302, and inputs the encoded parameters to multiplexing section 105. In this application example, estimated value X'(m) of the scale factor of the original signal is calculated from the following Equation 5 by using scale factor Y(m) of the first layer decoded signal, predictive coefficient α(m), and residual difference e(m).

$$X'(m)=\alpha(m)\times Y(m)+e(m) \qquad \text{(Equation 5)}$$

In this way, in the application example shown in FIG. 8, although a code is separately needed for the error signal and the bit rate increases, the estimation accuracy of the scale factors of the original signal is improved.

In another application example, the predictive coefficients α(m) of a plurality of subbands may be regarded as one vector, and the vector may be determined by searching for the most appropriate candidate among the candidates included in a predictive coefficient vector codebook. In this way, the predictive coefficients α(m) of a plurality of subbands are indicated by one encoded parameters, and the amount of data in the encoded parameters of predictive coefficient α(m) is reduced, so that it is possible to reduce the bit rate.

With the present embodiment, although an example has been described where scalable coding apparatus 100 outputs the first layer encoded parameters and the second layer encoded parameters of the speech signal as a bit stream, the present invention is not limited to this example. For example, a configuration may be adopted where scalable coding apparatus 100 accumulates and stores first layer encoded parameters and second layer encoded parameters of the speech signal in a data storing section or the like (not shown).

Although a case has been described where searching section 303 in the present embodiment determines the predictive coefficients α(m) that minimize the error E indicated by Equation 2, the present invention is not limited to this example, and searching section 303 may search for predictive coefficients α(m) in a log domain as indicated by Equation 6, for example.

[2]

$$E=(\log_{10}X(m)-\log_{10}X'(m))^2 \qquad \text{Equation 6}$$

Although a case has been also described with the present embodiment where searching section 303 searches for all the candidates for predictive coefficients α(m) retained by predictive coefficient codebook 304, the present invention is not limited to this example, and searching section 303 may perform a search limited to part of the candidates that are retained by predictive coefficient codebook 304, for example.

Embodiment 2

Figure 9A:
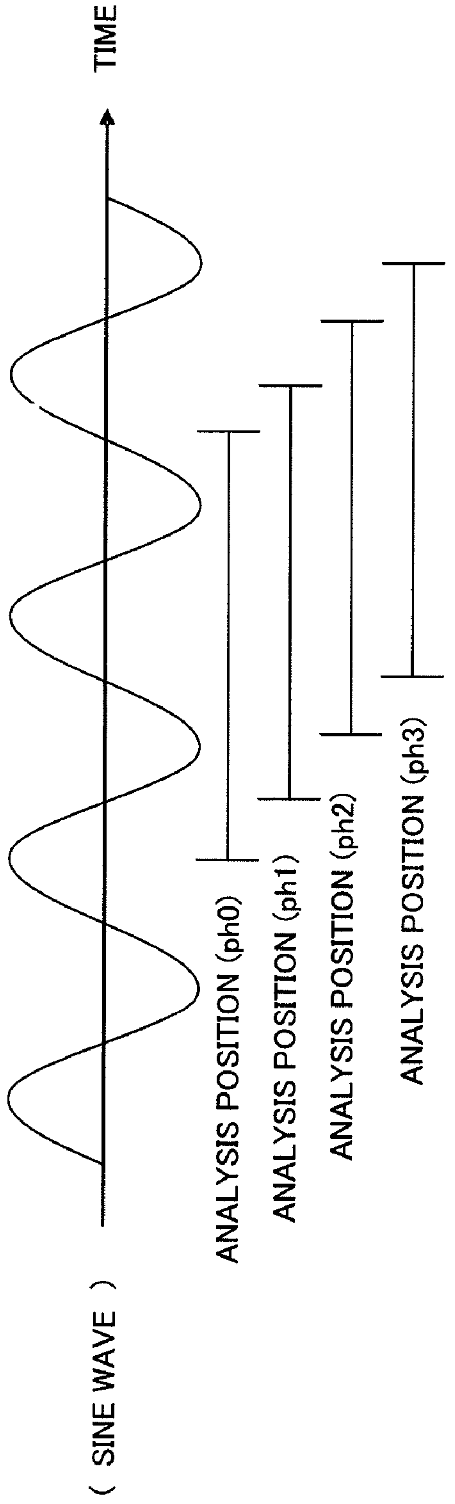
FIG. 9A is a diagram showing the relationship between a sine wave encoding scheme and a generated spectrum in Embodiment 2.
Figure 9B:
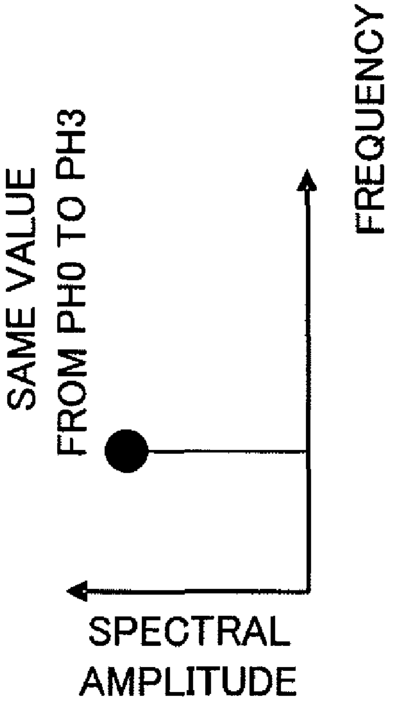
FIG. 9B is a diagram showing the relationship between a sine wave encoding scheme and a generated spectrum in Embodiment 2.
Figure 9C:
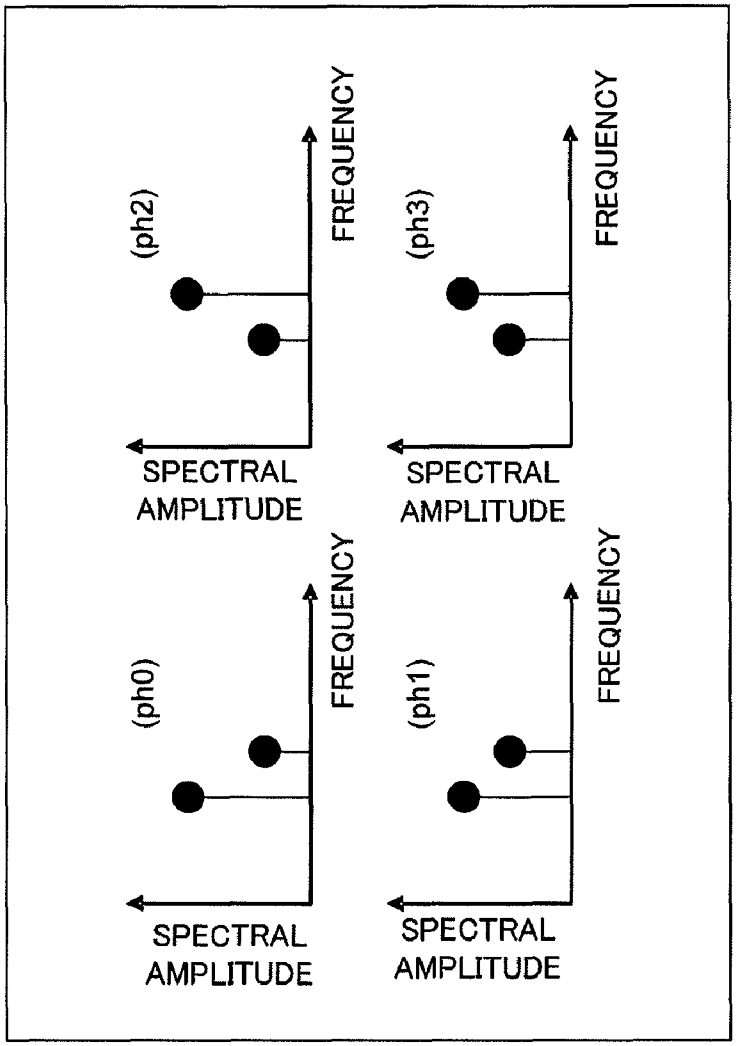
FIG. 9C is a diagram showing the relationship between a sine wave encoding scheme and a generated spectrum in Embodiment 2.

FIGS. 9A through 9C show the variance of the spectral amplitudes obtained in the processing, by changing the analysis positions, when spectral analysis is performed on a sine wave signal using Fast Fourier Transform (FFT) processing or MDCT processing.

The speech signal is a sine wave, as shown in FIG. 9A, and the spectrum of this signal is therefore expected to be one line spectrum. When the speech signal is subjected to FFT transform and spectral analysis, the spectrum is expressed as one line spectrum regardless of the analysis position, as shown in FIG. 9B. However, in spectral analysis using MDCT, the calculated spectrum changes according to the analysis position, as shown in FIG. 9C. In other words, the spectrum calculated by spectral analysis using MDCT is influenced by the phase of the waveform of the spectrum. Therefore, when scale factor calculating sections 202 and 204 generate scale factors (spectral outline) based on the MDCT coefficients of the first layer decoded signal inputted from MDCT analyzing sections 201 and 203 as described in Embodiment 1, the generated scale factors may not truly reflect the spectrum upon which the scale factors are based.

Furthermore, with the scalable coding apparatus described in Embodiment 1, quantization is performed in the generation of the first layer encoded parameters and the first layer decoded signal, and there is therefore a latent quantization distortion in the first layer encoded parameters or signal. Accordingly, with the scalable coding apparatus of Embodiment 1, there is a risk of a difference in phase between the original signal inputted to second layer coding section 104 and the first layer decoded signal—in other words, there is a potential for increasing the correlation between the spectral outline of the original signal and the spectral outline of the first layer decoded signal. This tendency increases particularly when a high-efficiency encoding method such as a CELP scheme is applied in the first layer.

Therefore, with Embodiment 2 of the present invention, a means is adopted that is able to further increase the correlation between the spectral outline of the original signal and the spectral outline of the first layer decoded signal even when a high-efficiency encoding method such as a CELP scheme is used in the first layer.

Figure 10:
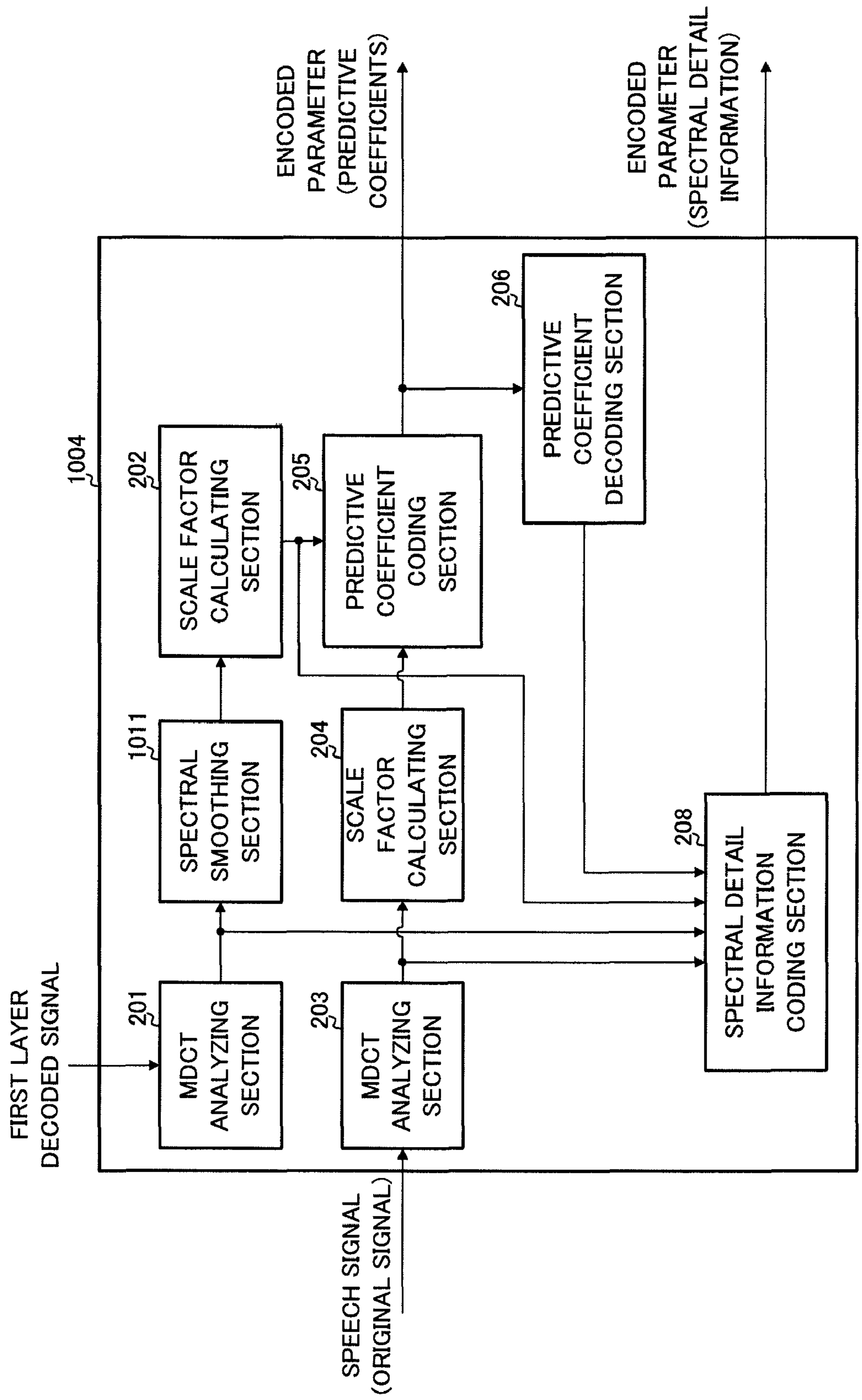
FIG. 10 is a block diagram showing the primary configuration of the second layer coding section in Embodiment 2.

FIG. 10 is a block diagram showing the primary configuration of second layer coding section 1004 in the scalable coding apparatus of the present embodiment. Second layer coding section 1004 is used instead of second layer coding section 104 in scalable coding apparatus 100, and is furthermore provided with a spectral smoothing section 1011 between MDCT analyzing section 201 and scale factor calculating section 202 in second layer coding section 104. Accordingly, second layer coding section 1004 is provided with many components that have the same function as components of second layer coding section 104, and therefore, with respect to components that have the same functions, their descriptions will be omitted to prevent redundancy.

Spectral smoothing section 1011 uses the neighbors of each MDCT coefficient to smooth the MDCT coefficients, i.e., the spectrum, of the first layer decoded signal inputted from MDCT analyzing section 201, and inputs the smoothed spectrum to scale factor calculating section 202. Although with the present embodiment, the scale factors of the first layer decoded signal that has been smoothed is inputted from scale factor calculating section 202 to spectral detail information coding section 208, the scale factors of the smoothed first layer decoded signal is inputted for use as a reference, and the function of spectral detail information coding section 208 is substantially the same as in Embodiment 1.

Figure 11:
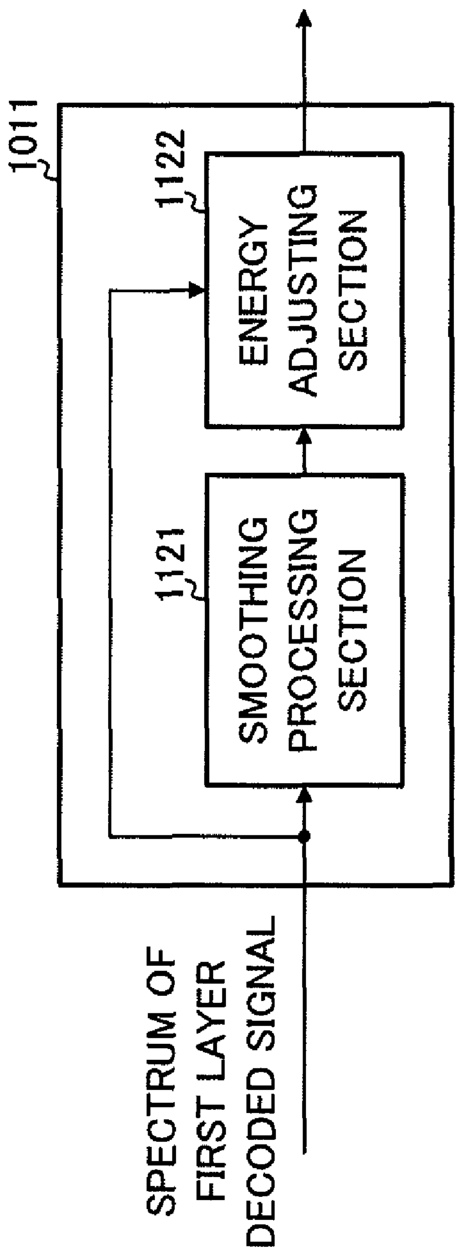
FIG. 11 is a block diagram showing the primary configuration of the spectral smoothing section in Embodiment 2.

FIG. 11 is a block diagram showing the primary configuration of spectral smoothing section 1011. Spectral smoothing section 1011 is provided with smoothing processing section 1121 and energy adjusting section 1122. The operations of spectral smoothing section 1011 will be described hereinafter.

Figure 12:
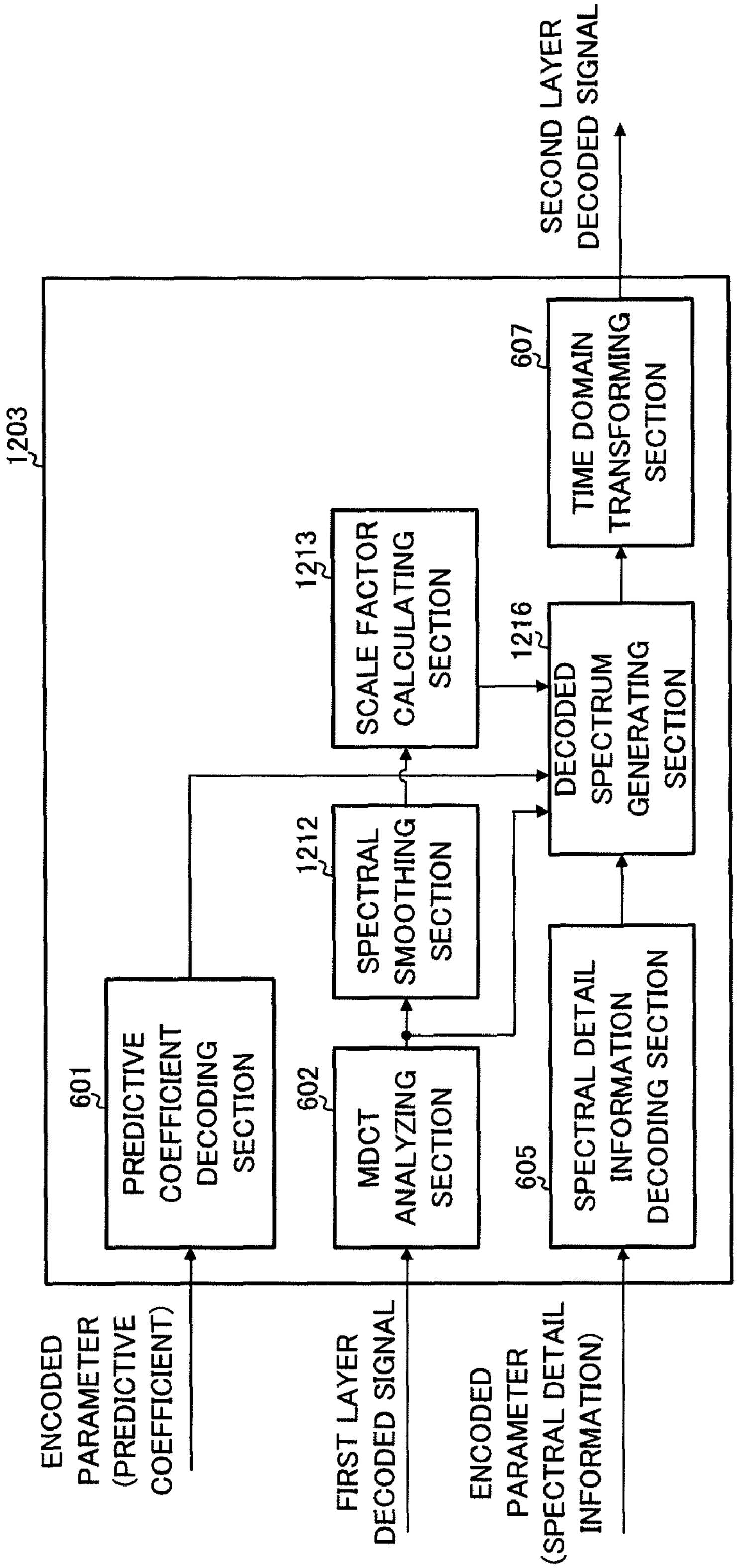
FIG. 12 is a block diagram showing the primary configuration of the scalable decoding apparatus according to Embodiment 2.

FIG. 12 is a block diagram showing the primary configuration of second layer decoding section 1203 in the scalable decoding apparatus according to the present embodiment. Second layer decoding section 1203 is used instead of second layer decoding section 503 in scalable decoding apparatus 500, is provided with decoded spectrum generating section 1216 instead of decoded spectrum generating section 606 in second layer decoding section 503, and is newly provided with spectral smoothing section 1212 and scale factor calculating section 1213 between MDCT analyzing section 602 and decoded spectrum generating section 606. In the same manner as spectral smoothing section 1011, spectral smoothing section 1212 is provided with smoothing processing section 1121 and energy adjusting section 1122 shown in FIG. 11. Accordingly, second layer decoding section 1203 is provided with many components that have the same function as components of second layer decoding section 503 or spectral smoothing section 1011, and, therefore, with respect to components that have the same functions, their descriptions will be omitted to prevent redundancy.

Spectral smoothing sections 1011 and 1212 calculate a weighted average value of the subject spectrum and the adjacent spectrum when smoothing the spectrum of the first layer decoded signal inputted from MDCT analyzing section 201 or MDCT analyzing section 602. For example, smoothing processing section 1121 in spectral smoothing sections 1011 and 1212 performs spectral smoothing according to the following Equation 7.

[3]

$$S'(k) = \sqrt{\sum_{i=-L}^{L} \beta(i) \cdot S^2(k+i)} \qquad \text{(Equation 7)}$$

In this equation, S(k) is the un-smoothed MDCT spectrum S'(k) is the smoothed MDCT spectrum β(i) is the weighting coefficient, and L is the range in which the average is calculated.

Alternatively, spectral smoothing sections 1011 and 1212 calculate a difference between the subject spectrum and the adjacent spectrum when smoothing the spectrum of the first layer decoded signal inputted from MDCT analyzing section 201 or MDCT analyzing section 602. For example, smoothing processing section 1121 in spectral smoothing sections 1011 and 1212 performs spectral smoothing according to the following Equation 8.

[4]

$$S'(k) = \sqrt{\gamma 1 \cdot S^2(k) + \gamma 2 \cdot (S(k-1) - S(k+1))^2} \qquad \text{(Equation 8)}$$

In this equation, γ1 and γ2 represent weighting coefficients.

Energy adjusting section 1122 in spectral smoothing sections 1011 and 1212 adjusts the spectrum of the first layer decoded signal smoothed by smoothing processing section 1121 so that the spectral energy is identical before and after smoothing.

Scale factor calculating section 1213 functions in the same manner as scale factor calculating section 202, and calculates scale factors of the subbands in the first layer decoded signal based on the MDCT coefficients of the smoothed first layer decoded signal inputted from spectral smoothing section 1212. Scale factor calculating section 1213 inputs the calculated scale factors of the first layer decoded signal to decoded spectrum generating section 1216.

Decoded spectrum generating section 1216 generates the decoded spectrum of the original signal from the decoded predictive coefficients inputted from predictive coefficient decoding section 601, the MDCT coefficients of the first layer decoded signal inputted from MDCT analyzing section 602, the scale factors of the first layer decoded signal inputted from scale factor calculating section 1213, and the spectral detail information inputted from spectral detail information decoding section 605, and inputs the generated decoded spectrum of the original signal to time domain transforming section 607. For example, decoded spectrum generating section 1216 calculates the decoded spectrum U(k) of the original signal using the following Equation 9.

[5]

$$U(k) = C(k) + \alpha'(m) \cdot \frac{Z(m)}{Y(m)} B(k) \qquad \text{(Equation 9)}$$

In Equation 9, C(k) is the spectral detail information, α'(m) is the decoded predictive coefficient of the m-th subband, B(k) is the MDCT coefficient of the first layer decoded signal, and k is a frequency included in the m-th subband. The term Y(m) is the scale factor of the first layer decoded signal in the m-th subband, and Z(m) is the scale factor of the smoothed first layer decoded signal in the m-th subband.

Figure 13:
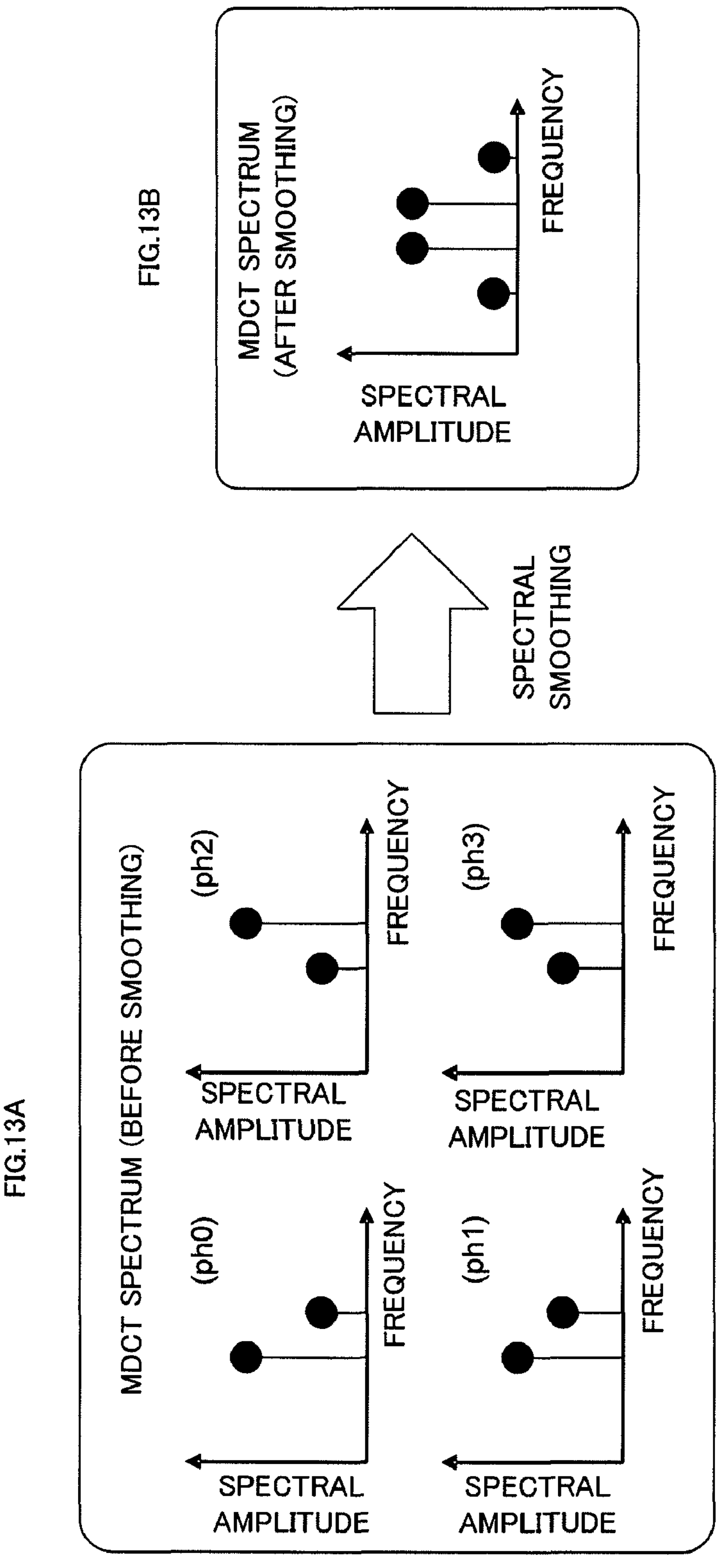
FIG. 13 is a diagram showing aspects before and after spectral smoothing by MDCT in Embodiment 2.

FIG. 13A is a conceptual diagram of the spectra obtained when the sine wave shown in FIG. 9 is subjected to spectral analysis using MDCT in the four analysis positions ph0, ph1, ph2, and ph3. The spectrum shown in FIG. 13B is calculated by smoothing of the spectra shown in FIG. 13A by spectral smoothing section 1011 or spectral smoothing section 1212 according to Equation 7 or Equation 8. Fluctuation occurs as shown in FIG. 13A in the spectrum originally calculated by spectral analysis using MDCT. In contrast, this fluctuation is reduced in the spectrum that has been smoothed by spectral smoothing section 1011 or spectral smoothing section 1212, as shown in FIG. 13B. When fluctuation of the spectrum calculated by spectral analysis using MDCT is reduced, there is a decrease in the number of cases in which the smoothed spectrum deviates significantly from the spectrum of the original signal, and the spectrum of the original signal is reflected more accurately overall.

In this way, according to the present embodiment, spectral smoothing section 1011 or spectral smoothing section 1212 performs spectral smoothing on the spectrum of the first layer decoded signal, so that the correlation is strengthened between the spectral outline calculated from the smoothed spectrum, and the spectral outline of the original signal calculated by scale factor calculating section 204. As a result, according to the present embodiment, the encoding efficiency at predictive coefficient coding section 205 is further enhanced.

For reference, FIG. 17 shows an example of the results of calculating the quantization performance of the scale factors by computer simulation. In the example shown in FIG. 17, the scale factor predictive coefficient α(m) of each subband are quantized using a 4-bit scalar quantizer. In the example shown in FIG. 17, the SNR's (Signal-to-Noise Ratio) are calculated according to the following Equation 10 by using the quantized scale factor $X_q(m)$ with respect to the un-quantized scale factor X(m) of the original signal.

[6]

$$SNR = 10 \cdot \log_{10}\left(\frac{\sum_m X(m)^2}{\sum_m (X(m) - X_q(m))^2}\right) \text{[dB]} \quad \text{(Equation 10)}$$

As shown in FIG. 17, although SNR decreases slightly in a clean speech when smoothing is performed, the SNR is significantly improved for audio and speeches mixed with in-car noise compared to the case in which smoothing is not performed. Accordingly, the effects of spectral smoothing can be considered to be significant.

Embodiment 3

Human hearing characteristics have perceptual masking characteristics, by which, when a certain signal is audible, an incoming sound in a frequency close to the signal is difficult to be heard. Therefore, with the present embodiment, these perceptual masking characteristics are utilized to enhance the encoding efficiency of the predictive coefficients and spectral detail information, which are components of the second layer encoded parameters.

Figure 14:
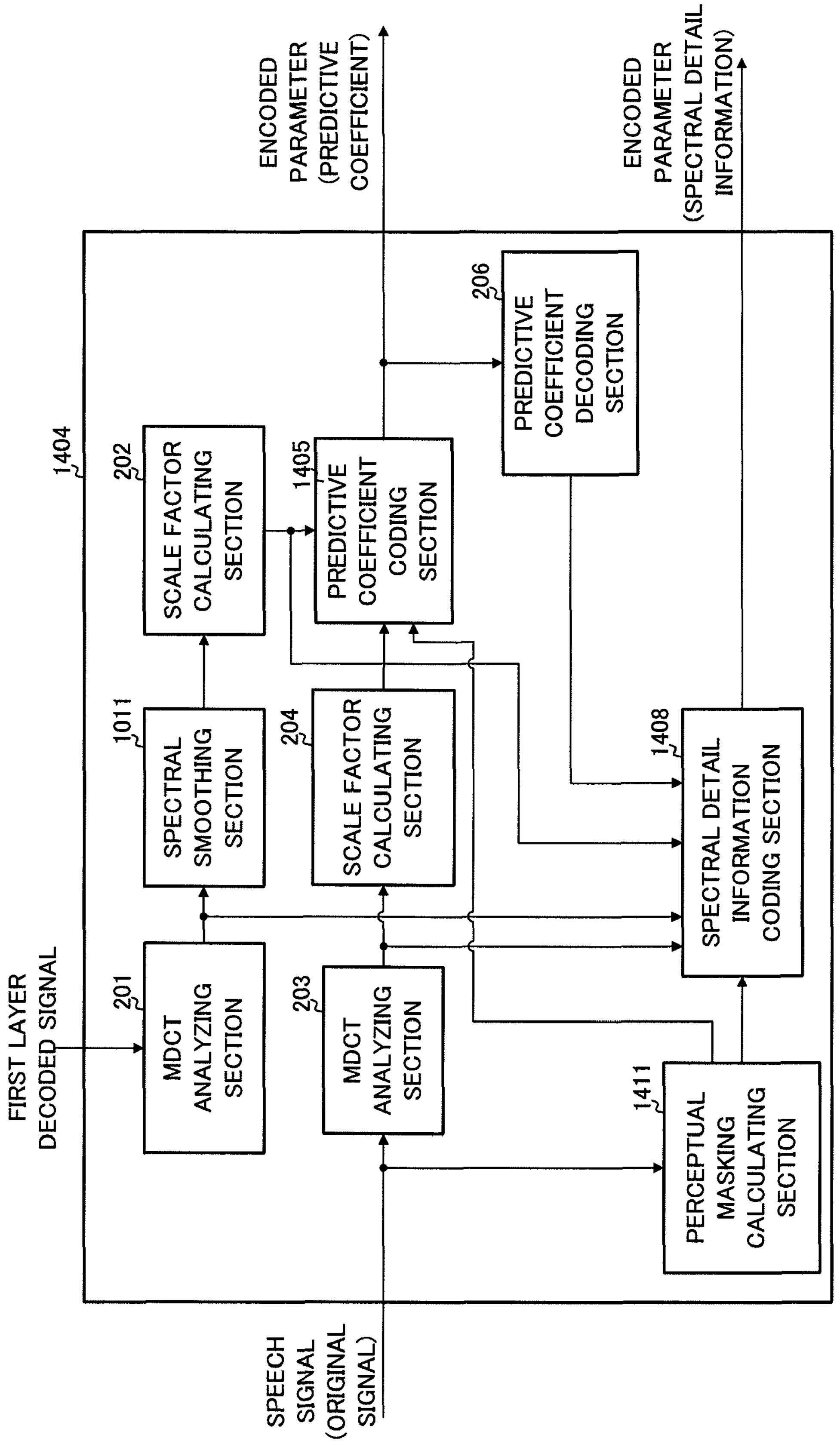
FIG. 14 is a block diagram showing the primary configuration of the second layer coding section in Embodiment 3.

FIG. 14 is a block diagram showing the primary configuration of second layer coding section 1404 in the scalable coding apparatus according to Embodiment 3 of the present invention. Second layer coding section 1404 is provided with predictive coefficients coding section 1405 instead of predictive coefficient coding section 205 in second layer coding section 1004 in Embodiment 2, spectral detail information coding section 1408 instead of spectral detail information coding section 208, and, newly, perceptual masking calculating section 1411. Accordingly, second layer coding section 1404 is provided with many components that have the same function as components of second layer coding sections 104 and 1004, and therefore, with respect to components that have the same functions, their descriptions will be omitted to prevent redundancy.

Perceptual masking calculating section 1411 reports a perceptual masking T(m) that is predetermined for each subband of the original signal inputted from delay section 102, to predictive coefficient coding section 1405 and spectral detail information coding section 1408.

Predictive coefficient coding section 1405 compares, per subband, the sizes of the error scale factor E(m) and the perceptual masking T(m) that are reported from perceptual masking calculating section 1411, determines that quantization distortion that occurs in the subband can be perceived by human perceptual when the error scale factor E(m) exceeds the perceptual masking T(m), encodes the predictive coefficients for the subband, and inputs the encoded parameters to multiplexing section 105. The error scale factor E(m) is calculated as the difference between the scale factors of the original signal and the scale factors of the first layer decoded signal. Predictive coefficient coding section 1405 preferably encodes information indicating whether or not predictive coefficients are encoded for each subband, inputs the encoded information to multiplexing section 105, and transmits the information to scalable decoding apparatus 500.

In the same manner as predictive coefficient coding section 1405, spectral detail information coding section 1408 also determines that quantization distortion that occurs in the corresponding subband can be perceived by human perceptual only when the error scale factor E(m) exceeds the perceptual masking T(m), encodes the spectral detail information for the subband, and inputs the result to multiplexing section 105. Spectral detail information coding section 1408 preferably encodes information indicating whether or not spectral detail information is encoded for each subband, inputs the encoded information to multiplexing section 105, and transmits the information to scalable decoding apparatus 500.

In this way, according to the present embodiment, second layer coding section 1404 determines whether or not perceptual masking effects are effectively demonstrated for each subband of the original signal, and does not encode the predictive coefficients and the spectral detail information for subbands in which perceptual masking effects are effectively demonstrated, so that the encoding efficiency of the second layer encoded parameters of the speech signal can be improved. As a result, according to the present embodiment, it is possible to obtain high sound quality and an even greater reduction in the bit rate of the speech signal at the same time.

A configuration may be adopted in the present embodiment in which predictive coefficient coding section 1405 or spectral detail information coding section 1408 compares the perceptual masking T(m) and the error scale factor E(m) for each subband, and increases the number of bits during encoding of the predictive coefficients or the spectral detail information according to the extent to which the error scale factor E(m) exceeds the perceptual masking T(m) and reduce the error scale factor E(m) of that subband. It is also preferred in this case that predictive coefficient coding section 1405 or spectral detail information coding section 1408 transmits information that indicates the number of bits allocated to the predictive coefficients or the spectral detail information for each subband to scalable decoding apparatus 500.

The scalable coding apparatus according to the present invention may be modified and applied as described below.

Although examples have been described in the embodiments according to the present invention where a speech signal has been subjected to scalable encoding in two stages that includes a first layer (lower layer) and a second layer (upper layer), the present invention is not limited to these examples, and the scalable encoding may include three or more stages, for example.

With the present invention, the sampling rate of each layer may be adjusted so as to establish the relation $Fs(n) \leqq Fs(n+1)$, wherein Fs(n) is the sampling rate of a signal in the n-th layer. In other words, the sampling rate in first layer coding section 101 or first layer decoding section 502 may be set lower than the sampling rate in second layer coding section 104 or second layer decoding section 503. By doing so, it is possible to realize bandwidth scalability, and the high-fidelity created by the decoded signal can be even further enhanced when network conditions are good, or when the user is using a highly capable device.

Although examples have been described in the embodiments of the present invention where spectral analysis has been performed using MDCT, the present invention is not limited to these examples, and spectral analysis may also be performed using another scheme, e.g., DFT, cosine transform, wavelet transform, or the like.

Reference Example

Although scalable encoding of a speech signal is not performed in this reference example, spectral smoothing is used in a manner used in Embodiment 2 of the present invention to predict the scale factors when the scale factors of a past frame are used to predict the scale factors of the current frame.

Figure 15:
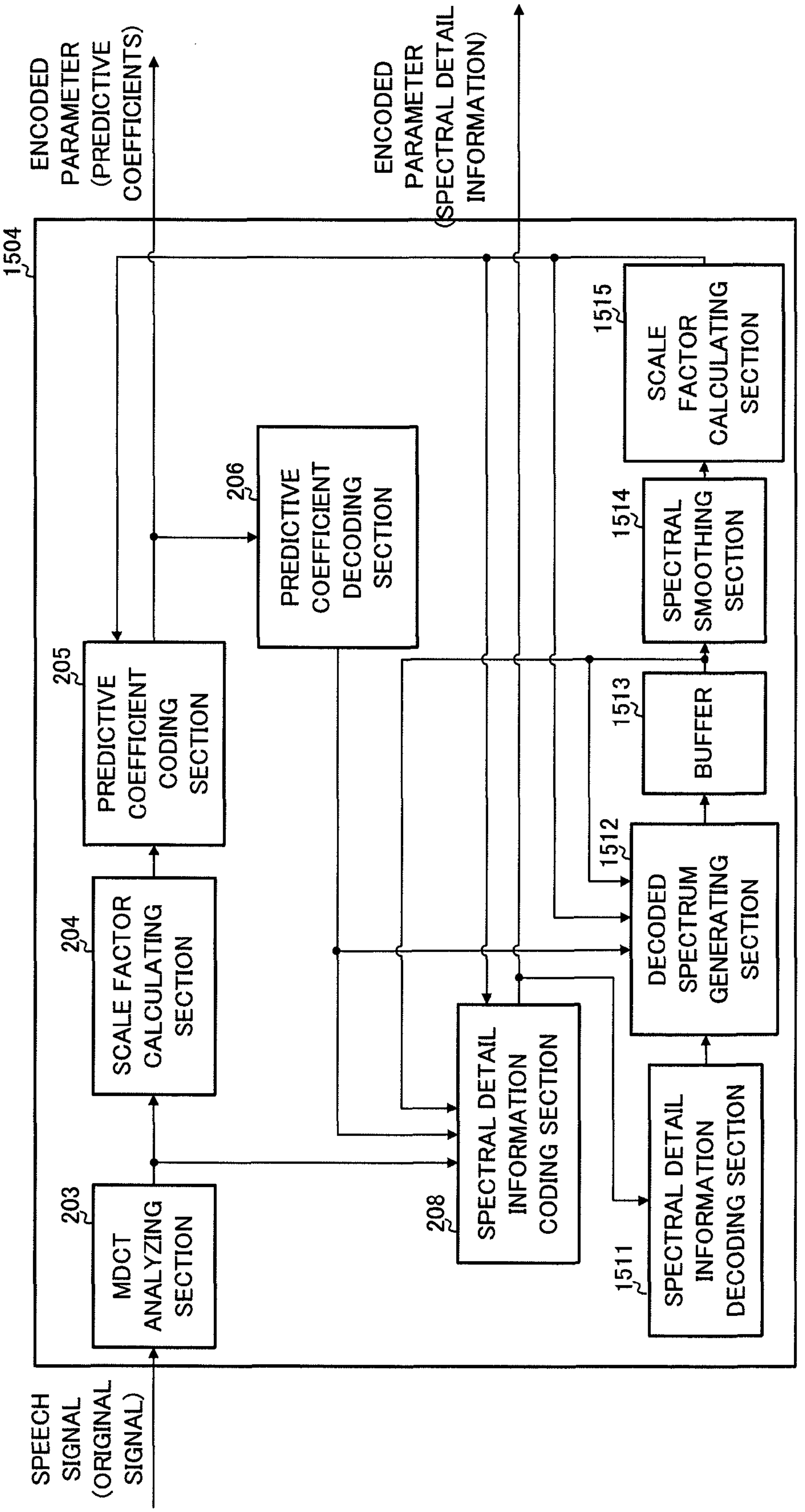
FIG. 15 is a block diagram showing the main components in the speech coding apparatus according to the reference example.

FIG. 15 is a block diagram showing the primary configuration of speech coding apparatus 1504 according to the present reference example. Speech coding apparatus 1504 is provided with components that have the same functions as MDCT analyzing section 203, scale factor calculating section 204, predictive coefficient coding section 205, predictive coefficient decoding section 206, and spectral detail information coding section 208 in second layer coding section 1004. Speech coding apparatus 1504 is further newly provided with spectral detail information decoding section 1511, decoded spectrum generating section 1512, buffer 1513, spectral smoothing section 1514, and scale factor calculating section 1515. Spectral detail information decoding section 1511 has the same function as spectral detail information decoding section 605 in second layer decoding section 1203; decoded spectrum generating section 1512 has the same function as decoded spectrum generating section 1216; spectral smoothing section 1514 has the same function as spectral smoothing section 1011 in second layer coding section 1004; and scale factor calculating section 1515 has the same function as scale factor calculating section 202. Although speech coding apparatus 1504 will be described hereinafter, with respect to components that have the same functions as components of second layer coding section 1004 and second layer decoding section 1203, their descriptions will be omitted to prevent redundancy.

Buffer 1513 stores a decoded spectrum inputted from decoded spectrum generating section 1512, and inputs the decoded spectrum of the stored previous frame to spectral smoothing section 1514, spectral detail information coding section 208, and decoded spectrum generating section 1512 when a new decoded spectrum is inputted.

Accordingly, speech coding apparatus 150 performs spectral smoothing on the decoded spectrum of the previous frame stored in buffer 1513 and calculates scale factors. As a result, predictive coefficient coding section 205 calculates the predictive coefficients of the current frame based on the scale factors of the previous frame. Spectral detail information coding section 208 encodes spectral detail information and decoded spectrum generating section 1512 generates a decoded spectrum, using the decoded spectrum of the previous frame, respectively.

Figure 16:
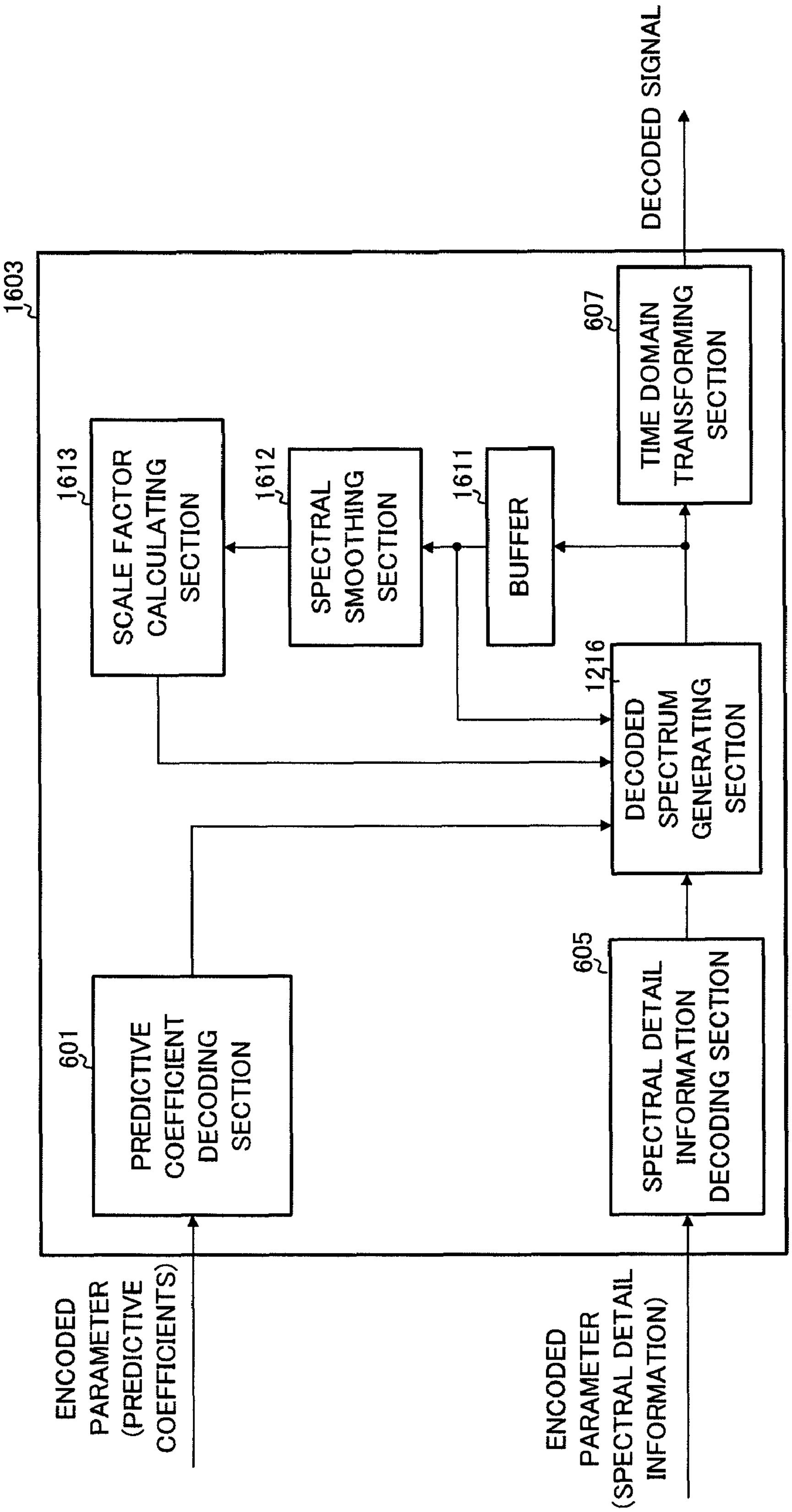
FIG. 16 is a block diagram showing the main components in the speech coding apparatus according to the reference example.

FIG. 16 is a block diagram showing the primary configuration of speech decoding apparatus 1603 according to the present reference example. Speech decoding apparatus 1603 is provided with components that have the same functions as predictive coefficient decoding section 601, spectral detail information decoding section 605, decoded spectrum generating section 1216, and time domain transforming section 607 in second layer decoding section 1203, and is further newly provided with buffer 1611, spectral smoothing section 1612, and scale factor calculating section 1613. Spectral smoothing section 1612 has the same function as spectral smoothing section 1212 in second layer decoding section 1203, and scale factor calculating section 1613 has the same function as scale factor calculating section 1213. Although speech decoding apparatus 1603 will be described hereinafter, with respect to components that have the same functions as second layer decoding section 1203, their description will be omitted to prevent redundancy.

Buffer 1611 stores a decoded spectrum inputted from decoded spectrum generating section 1216, and inputs the decoded spectrum of the stored previous frame to spectral smoothing section 1612 and decoded spectrum generating section 1216 when a new decoded spectrum is inputted.

Accordingly, speech decoding apparatus 1603 performs spectral smoothing on the decoded spectrum of the previous frame stored in buffer 1611 and calculates scale factors. As a result, decoded spectrum generating section 1216 predicts the scale factors of the current frame based on the scale factors of the previous frame and performs decoding using this scale factors.

Decoded spectrum generating section 1216 calculates decoded spectrum U(k) of the original signal using the following Equation 11.

[7]

$$U(k) = C(k) + \alpha'(m) \cdot \frac{Zprv(m)}{Yprv(m)} Bprv(k) \quad \text{(Equation 11)}$$

In Equation 11, C(k) represents the spectral detail information, α'(m) represents the decoded predictive coefficient of the m-th subband, Bprv(k) represents the MDCT coefficient of the previous frame, and k represents a frequency included in the m-th subband. Also, Yprv(m) represents the scale factors of the previous frame in the m-th subband, and Zprv(m) represents the scale factors of the previous smoothed frame in the m-th subband.

In this way, according to the configuration of the present reference example, by predicting a spectral outline using the temporal correlation of spectral outlines, it is possible to encode the scale factors efficiently and achieve reduction of the bit rate thereof.

The embodiments of the present invention have been described above.

The scalable coding apparatus and scalable decoding apparatus of the present invention are not limited to the embodiments described above, and may include various types of modifications. For example, it is possible to combine and implement the embodiments appropriately.

The scalable coding apparatus and scalable decoding apparatus according to the present invention can also be mounted in a communication terminal apparatus and a base station apparatus in a mobile communication system, thereby providing a communication terminal apparatus, a base station apparatus, and a mobile communication system that have the same operational effects as those described above.

A case has been described here as an example in which the present invention is configured with hardware, but the present invention can also be implemented as software. For example, the same function as the scalable coding apparatus of the present invention may be performed by describing the algorithm of the scalable encoding method of the present invention using a programming language, storing this program in memory, and executing the program using an information processing means.

In addition, each of functional blocks employed in the description of the above-mentioned embodiment may typically be implemented as an LSI constituted by an integrated circuit. These are may be individual chips or partially or totally contained on a single chip.

"LSI" is adopted here but this may also be referred to as an "IC," "system LSI," "super LSI," or "ultra LSI" depending on differing extents of integration.

Further, the method of integrating circuits is not limited to the LSI's, and implementation using dedicated circuitry or general purpose processor is also possible. After LSI manufacture, utilization of FPGA (Field Programmable Gate Array) or a reconfigurable processor where connections or settings of circuit cells within an LSI can be reconfigured is also possible.

Furthermore, if integrated circuit technology comes out to replace LSI's as a result of the advancement of semiconductor technology or derivative other technology, it is naturally also possible to carry out function block integration using this technology. Application in biotechnology is also possible.

The present application is based on Japanese Patent Application No. 2004-298942 filed on Oct. 13, 2004, the entire content of which is expressly incorporated by reference herein.

Industrial Applicability

The scalable coding apparatus according to the present invention has the advantages of improving the encoding efficiency in the second layer and enhancing the quality of the original signal decoded using the encoded parameters in the second layer, and is useful in mobile communication systems and the like in which a low bit rate and high-quality sound reproduction are required.

The invention claimed is:

1. A scalable coding apparatus, comprising:

a lower layer coder that encodes an input signal and generates lower layer encoded parameters;

a lower layer decoder that decodes the lower layer encoded parameters and generates a lower layer decoded signal;

a first spectral outline calculator that calculates a spectral outline of the input signal based on the input signal;

a second spectral outline calculator that calculates a spectral outline of the lower layer decoded signal based on the lower layer decoded signal;

a predictive information coder that obtains predictive information by predicting the spectral outline of the input signal from the spectral outline of the lower layer decoded signal and encodes the predictive information;

a predictive information decoder that decodes the encoded predictive information;

a spectral detail information coder that generates an estimated spectrum of the input signal based on a spectrum of the lower layer decoded signal and the decoded predictive information, and generates and encodes spectral detail information that indicates a spectral characteristic of the input signal that does not appear in the spectral outline of the input signal based on a spectrum of the input signal and the estimated spectrum of the input signal; and an outputter that outputs the lower layer encoded parameters and outputs the encoded predictive information and the encoded spectral detail information as upper layer encoded parameters.

2. The scalable coding apparatus according to claim 1, wherein the second spectral outline calculator calculates the spectral outline of the lower layer decoded signal after smoothing a spectrum of the lower layer decoded signal that is generated based on the lower layer decoded signal.

3. The scalable coding apparatus according to claim 1, wherein the predictive information comprises predictive coefficients that, upon being multiplied by the spectral outline of the lower layer decoded signal, approximate the spectral outline of the input signal.

4. The scalable coding apparatus according to claim 3, wherein the input signal comprises a plurality of predetermined frequency bands, each of the predictive coefficients is determined for one of the plurality of predetermined frequency bands of the input signal, and when one of the predetermined frequency bands of the input signal has a plurality of predictive coefficients that, upon being multiplied by the spectral outline of the lower layer decoded signal, approximate the spectral outline of the input signal, the predictive information coder performs vector quantization on the plurality of predictive coefficients collectively.

5. The scalable coding apparatus according to claim 1, wherein the input signal comprises a plurality of predetermined frequency bands, the predictive information coder determines whether or not a perceptual masking effect is effectively achieved in each of the predetermined frequency bands of the input signal, and for each of the predetermined frequency bands in which the perceptual masking effect is determined not to be effectively achieved, the predictive information coder predicts the spectral outline of the input signal from the spectral outline of the lower layer decoded signal to obtain the predictive information and encodes the predictive information.

6. The scalable coding apparatus according to claim 1, wherein the input signal comprises a plurality of predetermined frequency bands, the predictive information coder predicts the spectral outline of the input signal from the spectral outline of the lower layer decoded signal to obtain predictive information by determining an effectiveness of a perceptual masking effect for each of the predetermined frequency bands of the input signal and adjusting the number of encoded bits according to a degree of determined effectiveness and encodes the predictive information.

7. The scalable coding apparatus according to claim 1, wherein a sampling rate in the lower layer coder is lower than a sampling rate in the first spectral outline calculator.

8. A scalable decoding apparatus for decoding encoded parameters generated by a scalable coding apparatus performing scalable coding on an input signal, the encoded parameters including lower layer encoded parameters and upper layer encoded parameters, the upper layer encoded parameters including encoded predictive information and encoded spectral detail information, the scalable decoding apparatus comprising:

a lower layer decoder that decodes the lower layer encoded parameters and generates a lower layer decoded signal;

a predictive information decoder that decodes the encoded predictive information and generates predictive information for predicting a spectral outline of the input signal;

a spectral detail information decoder that decodes the encoded spectral detail information and generates spectrum detail information for indicating a spectral characteristic of the input signal that does not appear in the spectral outline of the input signal; and a spectrum generator that generates the spectral outline of the input signal based on the lower layer decoded signal, the predictive information, and the spectrum detail information, wherein the spectrum detail information is based on a spectrum of the input signal and an estimated spectrum of the input signal, the estimated spectrum of the input signal being based on a spectrum of the lower layer decoded signal and the decoded predictive information.

9. A scalable coding method, comprising:

coding, with one of a first circuit and a processor, an input signal and generating lower layer encoded parameters;

decoding, with one of a second circuit and the processor, the lower layer encoded parameters and generating a lower layer decoded signal;

calculating, with one of a third circuit and the processor, a spectral outline of the input signal based on the input signal;

calculating, with one of circuit and a fourth the processor, a spectral outline of the lower layer decoded signal based on the lower layer decoded signal;

predicting, with one of a fifth circuit and the processor, the spectral outline of the input signal from the spectral outline of the lower layer decoded signal to obtain predictive information, and coding the predictive information;

decoding, with one of a sixth circuit and the processor, the encoded predictive information;

generating, with one of a seventh circuit and the processor, an estimated spectrum of the input signal based on a spectrum of the lower layer decoded signal and the decoded predictive information, and generating and coding spectral detail information that indicates a spectral characteristic of the input signal that does not appear in the spectral outline of the input signal based on a spectrum of the input signal and the estimated spectrum of the input signal; and outputting the lower layer encoded parameters and outputting the encoded predictive information and the encoded spectral detail information as upper layer encoded parameters.

10. The scalable coding method according to claim 9, wherein the ones of the circuits are one of individually, partially, and totally integrated.

11. A scalable coding apparatus, comprising:

a lower layer coder that encodes an input signal and generates lower layer encoded parameters, the input signal including a plurality of predetermined frequency bands;

a lower layer decoder that decodes the lower layer encoded parameters and generates a lower layer decoded signal;

a first spectral outline calculator that calculates a spectral outline of the input signal based on the input signal;

a second spectral outline calculator that calculates a spectral outline of the lower layer decoded signal based on the lower layer decoded signal;

a predictive information coder that:

determines whether a perceptual masking effect is effectively achieved in each of the predetermined frequency bands of the input signal; and for each of the predetermined frequency bands in which the perceptual masking effect is determined not to be effectively achieved, obtains predictive information by predicting the spectral outline of the input signal from the spectral outline of the lower layer decoded signal, encodes the predictive information, and generates upper layer encoded parameters; and an outputter that outputs the lower layer encoded parameters and the upper layer encoded parameters.

12. A scalable decoding apparatus for decoding encoded parameters generated by a scalable coding apparatus that performs scalable coding on an input signal, the input signal including a plurality of predetermined frequency bands, the scalable decoding apparatus comprising:

a lower layer decoder that decodes the encoded parameters and generates a lower layer decoded signal;

a predictive information decoder that generates predictive information for predicting a spectral outline of the input signal by decoding the encoded parameters; and a spectrum generator that generates the spectral outline of the input signal based on the lower layer decoded signal and the predictive information, wherein the upper layer encoded parameters include predictive information that is encoded, and the predictive information is obtained by determining whether a perceptual masking effect is effectively achieved in each of the predetermined frequency bands of the input signal, and, for each of the predetermined frequency bands in which the perceptual masking effect is determined to be effectively achieved, the spectral outline of the input signal is predicted from the spectral outline of the lower layer decoded signal to obtain the predictive information.

13. A scalable coding method, comprising:

coding, with one of a first circuit and a processor, an input signal and generating lower layer encoded parameters, the input signal including a plurality of predetermined frequency bands;

decoding, with one of a second circuit and the processor, the lower layer encoded parameters and generating a lower layer decoded signal;

calculating, with one of a third circuit and the processor, a spectral outline of the input signal based on the input signal;

calculating, with one of a fourth circuit and the processor, a spectral outline of the lower layer decoded signal based on the lower layer decoded signal;

determining, with one of a fifth circuit and the processor, whether a perceptual masking effect is effectively achieved in each of the predetermined frequency bands of the input signal; and predicting, with one of a sixth circuit and the processor, for each of the predetermined frequency bands in which the perceptual masking effect is determined not to be effectively achieved, the spectral outline of the input signal from the spectral outline of the lower layer decoded signal to obtain predictive information, coding the predictive information, and generating upper layer encoded parameters.

* * * * *